(12) United States Patent
Saha et al.

(10) Patent No.: US 12,528,246 B2
(45) Date of Patent: Jan. 20, 2026

(54) PROJECTION TWO-PHOTON LITHOGRAPHY METHOD AND SYSTEM FOR RAPID PRINTING OF 3D STRUCTURES WITH SUB-MICROMETER FEATURES AND POROSITIES

(71) Applicant: Georgia Tech Research Corporation, Atlanta, GA (US)

(72) Inventors: Sourabh Kumar Saha, Atlanta, GA (US); Harnjoo Kim, Atlanta, GA (US); Rushil Pingali, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 131 days.

(21) Appl. No.: 18/608,097

(22) Filed: Mar. 18, 2024

(65) Prior Publication Data
US 2024/0351272 A1  Oct. 24, 2024

Related U.S. Application Data

(60) Provisional application No. 63/490,723, filed on Mar. 16, 2023.

(51) Int. Cl.
| | | |
|---|---|---|
| B29C 64/135 | (2017.01) | |
| B29C 64/273 | (2017.01) | |
| B33Y 10/00 | (2015.01) | |
| B33Y 30/00 | (2015.01) | |
| B33Y 70/00 | (2020.01) | |

(52) U.S. Cl.
CPC .......... *B29C 64/135* (2017.08); *B29C 64/273* (2017.08); *B33Y 10/00* (2014.12); *B33Y 30/00* (2014.12); *B33Y 70/00* (2014.12)

(58) Field of Classification Search
None
See application file for complete search history.

(56) References Cited

U.S. PATENT DOCUMENTS

| | | |
|---|---|---|
| 11,312,067 B2 | 4/2022 | Saha et al. |
| 2023/0194992 A1 | 6/2023 | Saha |

FOREIGN PATENT DOCUMENTS

| | | |
|---|---|---|
| FR | 3119562 | 8/2022 |

OTHER PUBLICATIONS

Saha et al, Scalable submicrometer additive manufacturing, Science. Oct. 4, 2019;366(6461):105-109. doi: 10.1126/science.aax8760 (Year: 2019).*

(Continued)

*Primary Examiner* — Yung-Sheng M Tsui
(74) *Attorney, Agent, or Firm* — Meunier Carlin & Curfman LLC

(57) ABSTRACT

Systems, methods, devices, and compositions of matter for 3D printing methods and systems that can be used for rapid nanoscale 3D printing of large and deterministic 3D structures with sub-micrometer features and porosities. The method includes storing or determining a plurality of interspersed features for a three-dimensional (3D) structure to project as a sequence of sparse images on the same plane to generate closely spaced fine features on a polymer resist; and generating, using the sequence of sparse images, a plurality of patterned light sheet on the polymer resist with a temporally-focused femtosecond pulse, the light sheet having patterns.

17 Claims, 11 Drawing Sheets

(56) References Cited

OTHER PUBLICATIONS

Aderneuer, T., O. Fernández, and R. Ferrini. 2021. "Two-photon Grayscale Lithography for Free-Form Micro-Optical Arrays." Optics Express 29 (24): 39511-39520. https://doi.org/10.1364/OE.440251.
Arnoux, C., L. A. Pérez-Covarrubias, A. Khaldi, Q. Carlier, P. L. Baldeck, K. Heggarty, A. Banyasz, and C. Monnereau. 2022. "Understanding and Overcoming Proximity Effects in Multi-Spot two-Photon Direct Laser Writing." Additive Manufacturing 49: 102491. https://doi.org/10.1016/j.addma.2021.102491.
Bakar, N. A., A. Abu-Siada, and S. Islam. 2014. "A Review of Dissolved Gas Analysis Measurement and Interpretation Techniques." IEEE Electrical Insulation Magazine 30 (3): 39-49. https://doi.org/10.1109/MEI.2014.6804740.
Bauer, J., C. Crook, and T. Baldacchini. 2023. "A Sinterless, Lowtemperature Route to 3D Print Nanoscale Optical-Grade Glass." Science 380 (6648): 960-966. https://doi.org/10.1126/science.abq3037.
Bauer, J., C. Crook, A. G. Izard, Z. C. Eckel, N. Ruvalcaba, T. A. Schaedler, and L. Valdevit. 2019. "Additive Manufacturing of Ductile, Ultrastrong Polymer-Derived Nanoceramics." Matter 1 (6): 1547-1556. https://doi.org/10.1016/j.matt.2019.09.009.
Bauer, J., L. R. Meza, T. A. Schaedler, R. Schwaiger, X. Zheng, and L. Valdevit. 2017. "Nanolattices: An Emerging Class of Mechanical Metamaterials." Advanced Materials 29 (40): 1701850. https://doi.org/10.1002/adma.201701850.
Bauer, J., A. Schroer, R. Schwaiger, and O. Kraft. 2016. "Approaching Theoretical Strength in Glassy Carbon Nanolattices." Nature Materials 15 (4): 438-443. https://doi.org/10.1038/nmat4561.
Cao, C., J. Liu, X. Xia, X. Shen, Y. Qiu, C. Kuang, and X. Liu. 2022. "Click Chemistry Assisted Organic-Inorganic Hybrid Photoresist for Ultra-Fast two-Photon Lithography." Additive Manufacturing 51: 102658. https://doi.org/10.1016/j.addma.2022.102658.
Carlotti, M., and V. Mattoli. 2019. "Functional Materials for Two-Photon Polymerization in Microfabrication." Small 15 (40): 1902687. https://doi.org/10.1002/smll.201902687.
Choi, H., E. Y. S. Yew, B. Hallacoglu, S. Fantini, C. J. R. Sheppard, and P. T. C. So. 2013. "Improvement of Axial Resolution and Contrast in Temporally Focused Widefield two-Photon Microscopy with Structured Light Illumination." Biomedical Optics Express 4 (7): 995-1005. https://doi.org/10.1364/BOE.4.000995.
Dietrich, P. I., M. Blaicher, I. Reuter, M. Billah, T. Hoose, A. Hofmann, C. Caer, et al. 2018. "In Situ 3D Nanoprinting of Free-Form Coupling Elements for Hybrid Photonic Integration." Nature Photonics 12 (4): 241-247. https://doi.org/10.1038/s41566-018-0133-4.
Fourkas, J. T. 2020. "Fundamentals of Two-Photon Fabrication. Three-Dimensional Microfabrication using Two-Photon Polymerization." Elsevier, 57-76. https://doi.org/10.1016/B978-0-12-817827-0.00051-5.
Gonzalez-Hernandez, D., S. Varapnickas, A. Bertoncini, C. Liberale, and M. Malinauskas. 2023. "Micro-Optics 3D Printed via Multi-Photon Laser Lithography." Advanced Optical Materials 11 (1): 2201701. https://doi.org/10.1002/adom.202201701.
Hahn, V., P. Kiefer, T. Frenzel, J. Qu, E. Blasco, C. Barner-Kowollik, and M. Wegener. 2020. "Rapid Assembly of Small Materials Building Blocks (Voxels) into Large Functional 3D Metamaterials." Advanced Functional Materials, 1907795. https://doi.org/10.1002/adfm.201907795.
Hahn, V., and M. Wegener. 2020. "Response to "Comment on Rapid Assembly of Small Materials Building Blocks (Voxels) into Large Functional 3D Metamaterials"." Advanced Functional Materials, 2003402. https://doi.org/10.1002/adfm.202003402.
Jiang, L. J., Y. S. Zhou, W. Xiong, Y. Gao, X. Huang, L. Jiang, T. Baldacchini, J.-F. Silvain, and Y. F. Lu. 2014. "Two-photon Polymerization: Investigation of Chemical and Mechanical Properties of Resins Using Raman Microspectroscopy." Optics Letters 39 (10): 3034-3037. https://doi.org/10.1364/OL.39.003034.
Jonušauskas, L., S. Juodkazis, and M. Malinauskas. 2018. "Optical 3D Printing: Bridging the Gaps in the Mesoscale." Journal of Optics 20 (5): 053001. *.
Kim, H., and S. K. Saha. 2020. "Defect Control During Femtosecond Projection Two-photon Lithography." Procedia Manufacturing 48: 650-655. https://doi.org/10.1016/j.promfg.2020.05.157.
Kim, H., and S. K. Saha, eds. 2022. Minimizing Shrinkage in Microstructures Printed With Projection Two-Photon Lithography. American Society of Mechanical Engineers, International Manufacturing Science and Engineering Conference. American Society of Mechanical Engineers. https://doi.org/10.1115/MSEC2022-86076.
Ladner, I. S., M. A. Cullinan, and S. K. Saha. 2019. "Tensile Properties of Polymer Nanowires Fabricated via two-Photon Lithography." RSC Advances 9 (49): 28808-28813. https://doi.org/10.1039/C9RA02350J.
LaFratta, C. N., and T. Baldacchini. 2017. "Two-photon Polymerization Metrology: Characterization Methods of Mechanisms and Microstructures." Micromachines 8 (4): 101. https://doi.org/10.3390/mi8040101.
Mettry, M., M. A. Worthington, B. Au, J.-B. Forien, S. Chandrasekaran, N. A. Heth, J. J. Schwartz, et al. 2021. "Refractive Index Matched Polymeric and Preceramic Resins for Height-Scalable two-Photon Lithography." RSC Advances 11 (37): 22633-9. https://doi.org/10.1039/D1RA01733K.
Meza, L. R., S. Das, and J. R. Greer. 2014. "Strong, Lightweight, and Recoverable Three-Dimensional Ceramic Nanolattices." Science 345 (6202): 1322-1326. https://doi.org/10.1126/science.1255908.
Moughames, J., X. Porte, M. Thiel, G. Ulliac, L. Larger, M. Jacquot, M. Kadic, and D. Brunner. 2020. "Three-dimensional Waveguide Interconnects for Scalable Integration of Photonic Neural Networks." Optica 7 (6): 640-646. https://doi.org/10.1364/OPTICA.388205.
Mueller, J. B., J. Fischer, F. Mayer, M. Kadic, and M. Wegener. 2014. "Polymerization Kinetics in Three-Dimensional Direct Laser Writing." Advanced Materials 26 (38): 6566-6571. https://doi.org/10.1002/adma.201402366.
Oakdale, J. S., R. F. Smith, J. B. Forien, W. L. Smith, S. J. Ali, L. B. Bayu Aji, T. M. Willey, et al. 2017. "Direct Laser Writing of low-Density Interdigitated Foams for Plasma Drive Shaping." Advanced Functional Materials 27 (43): 1702425. https://doi.org/10.1002/adfm.201702425.
Oakdale, J. S., J. Ye, W. L. Smith, and J. Biener. 2016. "Post-print UV Curing Method for Improving the Mechanical Properties of Prototypes Derived from two- Photon Lithography." Optics Express 24 (24): 27077-27086. https://doi.org/10.1364/OE.24.027077.
Oron, D., E. Tal, and Y. Silberberg. 2005. "Scanningless Depth-Resolved Microscopy." Optics Express 13 (5): 1468-1476. https://doi.org/10.1364/OPEX.13.001468.
Papagiakoumou, E., E. Ronzitti, and V. Emiliani. 2020. "Scanless Two-photon Excitation with Temporal Focusing." Nature Methods 17 (6): 571-581. https://doi.org/10.1038/s41592-020-0795-y.
Pingali, R., and S. K. Saha. 2022. "Reaction-Diffusion Modeling of Photopolymerization During Femtosecond Projection Two-Photon Lithography." Journal of Manufacturing Science and Engineering 144 (2). https://doi.org/10.1115/1.4051830.
Rumi, M., J. E. Ehrlich, A. A. Heikal, J. W. Perry, S. Barlow, Z. Hu, D. McCord-Maughon, et al. 2000. "Structure—Property Relationships for two-Photon Absorbing Chromophores: Bis-Donor Diphenylpolyene and bis (Styryl) Benzene Derivatives." Journal of the American Chemical Society 122 (39): 9500-9510. https://doi.org/10.1021/ja994497s.
Saha, S. K., and S.-C. Chen. 2020. "Comment on Rapid Assembly of Small Materials Building Blocks (Voxels) into Large Functional 3D Metamaterials." Advanced Functional Materials, 2001060. https://doi.org/10.1002/adfm.202001060.
Saha, S. K., C. Divin, J. A. Cuadra, and R. M. Panas. 2017. "Effect of Proximity of Features on the Damage Threshold During Submicron Additive Manufacturing via two-Photon Polymerization." Journal of Micro and Nano-Manufacturing 5 (3): 031002. https://doi.org/10.1115/1.4036445.

(56) References Cited

OTHER PUBLICATIONS

Saha, S. K., J. S. Oakdale, J. A. Cuadra, C. Divin, J. Ye, J. B. Forien, L. B. Bayu Aji, J. Biener, and W. L. Smith. 2018. "Radiopaque Resists for Two-Photon Lithography To Enable Submicron 3D Imaging of Polymer Parts via X-ray Computed Tomography," ACS Applied Materials & Interfaces 10 (1): 1164-1172. https://doi.org/10.1021/acsami.7b12654.

Saha, S. K., D. Wang, V. H. Nguyen, Y. Chang, J. S. Oakdale, and S.-C. Chen. 2019. "Scalable Submicrometer Additive Manufacturing," Science 366 (6461): 105-109. https://doi.org/10.1126/science.aax8760.

Sakellari, I., E. Kabouraki, D. Gray, V. Purlys, C. Fotakis, A. Pikulin, N. Bityurin, M. Vamvakaki, and M. Farsari. 2012. "Diffusionassisted High-Resolution Direct Femtosecond Laser Writing." ACS Nano 6 (3): 2302-2311. https://doi.org/10.1021/nn204454c.

Selimis, A., V. Mironov, and M. Farsari. 2015. "Direct Laser Writing: Principles and Materials for Scaffold 3D Printing." Microelectronic Engineering 132: 83-89. https://doi.org/10.1016/j.mee.2014.10.001.

Skliutas, E., M. Lebedevaite, E. Kabouraki, T. Baldacchini, J. Ostrauskaite, M. Vamvakaki, M. Farsari, S. Juodkazis, and M. Malinauskas. 2021. "Polymerization Mechanisms Initiated by Spatio-Temporally Confined Light." Nanophotonics 10 (4): 1211-1242. https://doi.org/10.1515/nanoph-2020-0551.

Somers, P., Z. Liang, J. E. Johnson, B. W. Boudouris, L. Pan, and X. Xu. 2021. "Rapid, Continuous Projection Multi-Photon 3D Printing Enabled by Spatiotemporal Focusing of Femtosecond Pulses." Light: Science & Applications 10 (1): 199. https://doi.org/10.1038/s41377-021-00645-z.

Sun, M., H. Cheng, P. Golvari, S. M. Kuebler, X. Yu, and M. Zhang. 2022. "Modeling of Two-photon Polymerization in the Strong-Pulse Regime." Additive Manufacturing 60: 103241. https://doi.org/10.1016/j.addma.2022.103241.

Sun, H.-B., and S. Kawata. 2004. Two-photon photopolymerization and 3D lithographic microfabrication. NMR○ 3D Analysis○ Photopolymerization: Springer. p. 169-273. https://doi.org/10.1007/b94405.

Torgersen, J., X. H. Qin, Z. Li, A. Ovsianikov, R. Liska, and J. Stampfl. 2013. "Hydrogels for Two-photon Polymerization: A Toolbox for Mimicking the Extracellular Matrix." Advanced Functional Materials 23 (36): 4542-4554. https://doi.org/10.1002/adfm.201203880.

Vyatskikh, A., S. Delalande, A. Kudo, X. Zhang, C. M. Portela, and J. R. Greer. 2018. "Additive Manufacturing of 3D Nano-Architected Metals." Nature Communications 9 (1): 1-8. https://doi.org/10.1038/s41467-018-03071-9.

Vyatskikh, A., R. C. Ng, B. Edwards, R. M. Briggs, and J. R. Greer. 2020. "Additive Manufacturing of High-Refractive-Index, Nanoarchitected Titanium Dioxide for 3D Dielectric Photonic Crystals." Nano Letters 20 (5): 3513-3520. https://doi.org/10.1021/acs.nanolett.0c00454.

Waller, E. H., and G. Von Freymann. 2016. "Spatio-temporal Proximity Characteristics in 3D u-Printing via Multi-Photon Absorption." Polymers 8 (8): 297. https://doi.org/10.3390/polym8080297.

Wu, S., J. Serbin, and M. Gu. 2006. "Two-photon Polymerisation for Three-Dimensional Micro-Fabrication." Journal of Photochemistry and Photobiology A: Chemistry 181 (1): 1-11. https://doi.org/10.1016/j.jphotochem.2006.03.004.

Xia, X., A. Afshar, H. Yang, C. M. Portela, D. M. Kochmann, C. V. Di Leo, and J. R. Greer. 2019. "Electrochemically Reconfigurable Architected Materials." Nature 573 (7773): 205-213. https://doi.org/10.1038/s41586-019-1538-z.

Yang, L., A. Münchinger, M. Kadic, V. Hahn, F. Mayer, E. Blasco, C. Barner-Kowollik, and M. Wegener. 2019. "On the Schwarzschild Effect in 3D two-Photon Laser Lithography." Advanced Optical Materials 7 (22): 1901040. https://doi.org/10.1002/adom.201901040.

Zheng, L., K. Kurselis, A. El-Tamer, U. Hinze, C. Reinhardt, L. Overmeyer, and B. Chichkov. 2019. "Nanofabrication of High-Resolution Periodic Structures with a gap Size Below 100 nm by Two-photon Polymerization." Nanoscale Research Letters 14 (1): 1-9. https://doi.org/10.1186/s11671-018-2843-4.

Zhu, G., J. Van Howe, M. Durst, W. Zipfel, and C. Xu. 2005. "Simultaneous Spatial and Temporal Focusing of Femtosecond Pulses." Optics Express 13 (6): 2153-2159. https://doi.org/10.1364/OPEX.13.002153.

Huang, Tian-Yun, et al. "3D printed microtransporters: Compound micromachines for spatiotemporally controlled delivery of therapeutic agents." Advanced materials (Deerfield Beach, Fla.) 27.42 (2015): 6644.

De Marco, Carmela, et al. "Indirect 3D and 4D printing of soft robotic microstructures." Advanced Materials Technologies 4.9 (2019): 1900332.

Soto, Fernando, et al. "Medical micro/nanorobots in precision medicine." Advanced science 7.21 (2020): 2002203.

Van der Velden, Gijs, D. Fan, and U. Staufer. "Fabrication of a microfluidic device by using two-photon lithography on a positive photoresist." Micro and Nano Engineering 7 (2020): 100054.

Vanderpoorten, Oliver, et al. "Scalable integration of nano-, and microfluidics with hybrid two-photon lithography." Microsystems & nanoengineering 5.1 (2019): 40.

\* cited by examiner

200a

202
Retrieve a plurality of interspersed features for a three-dimensional (3D) structure to project as a sequence of sparse images on the same plane to generate closely spaced fine features on a polymer resist

204
Generate, using the sequence of sparse images, a plurality of patterned light sheet on the polymer resist with a temporally-focused femtosecond pulse, the light sheet having sub-micrometer patterns

206
Determine a plurality of interspersed features for a three-dimensional (3D) structure to project as a sequence of sparse images on the same plane to generate closely spaced fine features on a polymer resist

204
Generate, using the sequence of sparse images, a plurality of patterned light sheet on the polymer resist with a temporally-focused femtosecond pulse, the light sheet having sub-micrometer patterns

FIG. 2B

PROJECTION TWO-PHOTON LITHOGRAPHY METHOD AND SYSTEM FOR RAPID PRINTING OF 3D STRUCTURES WITH SUB-MICROMETER FEATURES AND POROSITIES

CROSS-REFERENCE TO RELATED APPLICATIONS

This application claims the benefit of priority to U.S. Provisional Application No. 63/490,723, filed Mar. 16, 2023, which is incorporated by reference herein in its entirety.

GOVERNMENT SUPPORT CLAUSE

This invention was made with government support under Grant Nos. 2045147 and ECCS-2025462 awarded by the National Science Foundation. The Government has certain rights in the invention.

BACKGROUND

Three-dimensional (3D) printing of millimeter-to centimeter-scale polymeric structures with nanoscale features and porosities is highly desirable for creating a variety of functional materials that can help solve societal challenges in clean energy, computing, transportation, and human health. For example, it has been demonstrated that such 3D structures can be applied to build mechanical metamaterials for extreme mechanical properties (Bauer et al. 2016; Bauer et al. 2017; Bauer et al. 2019; Meza, Das, and Greer 2014), scaffolds for biomedical applications (Selimis, Mironov, and Farsari 2015; Torgersen et al. 2013), photonics for information processing (Dietrich et al. 2018; Gonzalez-Hernandez et al. 2023; Moughames et al. 2020), and structured electrodes for energy storage (Xia et al. 2019).

In general, there exists a trade-off between the rate of 3D printing and the resolution of printing, because of which it is challenging to fabricate high volumes of nanoporous 3D structures. Only limited success has been achieved in transitioning these functional materials from research laboratories to real-world use. Recent works in the field of two-photon lithography (TPL)-based nanoscale 3D printing have demonstrated how one may break this trade-off by drastically increasing the throughput via parallelization of processing or rapid sequential processing, or a combination of these two approaches (Cao et al. 2022; Hahn et al. 2020; Saha et al. 2019). Although these approaches have demonstrated the rapid printing of nanoscale features, achieving nanoscale porosities is still challenging due to the inherent proximity effects, which lead to the broadening and merging of closely spaced features.

There is a benefit to improving the printing of structures having nanoscale features and porosities with finer resolution of closely spaced features.

SUMMARY

Systems, methods, devices, and compositions of matter are disclosed for 3D printing methods and systems that, as a non-limiting example, can be used for rapid nanoscale 3D printing of large and deterministic 3D structures with sub-micrometer features and porosities. The exemplary system and method employs a lithography system that projects a design pattern as a sequence of sparse images can overcome fabrication challenges to produce structures for a variety of applications such as mechanical metamaterials for extreme mechanical properties; micro-robotics, micro-fluidics, and scaffolds for biomedical applications; photonics for information processing; and structured electrodes for energy storage. An exemplary photoresist has been developed and evaluated for use with the multiple-pattern projections in the rapid nanoscale 3D printing.

In one aspect, the present disclosure relates to a method (e.g., additive manufacturing method, e.g., two-photon lithography method). In one embodiment, the method includes: storing or determining a plurality of interspersed features for a three-dimensional (3D) structure to project as a sequence of sparse images on the same plane to generate closely spaced fine features on a polymer resist; and generating, using the sequence of sparse images, a plurality of patterned light sheet on the polymer resist with a temporally-focused femtosecond pulse, the light sheet having patterns.

In some embodiments, the plurality of interspersed features stored in a sequence of sparse images when projected to the polymer resist is used to generate a 3D structure that mitigates proximity effects for densely packed features.

In some embodiments, the sequence of sparse images has a selected pattern period higher than half of the sum of the width of a focal spot and the width of a polymerized feature (generated by the interspersed features of the pattern).

In some embodiments, duration, intensity, and/or size of the focused light spot of the femtosecond pulse are determined based on an optical dosage per pulse ($D_p$) model.

In some embodiments, the method further includes: generating, using the sequence of sparse images, a plurality of patterned light sheets with a temporally-focused femtosecond pulse on a second layer of polymer resist (e.g., to form the 3D structure), the light sheet having sub-micrometer patterns.

In some embodiments, the method is part of a P-TPL (projection two-photon lithography) operation configured to generate a 3D structure with features less than 300 nm, pores finer than 700 nm, and at rates greater than 0.5 mm²/s per layer.

In some embodiments, the method is part of a P-TPL operation configured to generate a 3D structure with features less than 300 nm (e.g., 0 nm to 300 nm).

In some embodiments, the method is part of a P-TPL operation configured to generate a 3D structure with features having pores less than 700 nm (e.g., where the features are not fully dense depending on the size of the light spot and up to 700 nm).

In some embodiments, the method is part of a P-TPL operation configured to generate a 3D structure at rates greater than 0.5 mm²/s per layer.

In some embodiments, the polymer resist includes at least a photoinitiator, a radical quencher, and a monomer, where the concentration of the photoinitiator is less than one-third the concentration of the radical quencher.

In some embodiments, the radical quencher includes dissolved oxygen.

In some embodiments, the solubility threshold DOC of the resist is less than 10%.

In some embodiments, the 3D structure is for at least one of: micro-robotic component, micro-fluidic component, scaffold for bioengineered tissue, mechanical metamaterial, photonic component (e.g., for information processing), or a structured electrode (e.g., for energy storage component).

In another aspect, the present disclosure relates to a system. In one embodiment, the system includes: a memory having instructions for a plurality of interspersed features for a 3D structure to project as a sequence of sparse images on the same plane to generate closely spaced fine features on a polymer resist; and lithography equipment configured to generate using the sequence of sparse images a plurality of patterned light sheet on the polymer resist with a temporally-focused femtosecond pulse, where the light sheet has patterns.

In yet another aspect, the present disclosure relates to a system. In one embodiment, the system includes a processor having instructions to generate a plurality of interspersed features for a 3D structure to project as a sequence of sparse images on the same plane to generate closely spaced fine features on a polymer resist; and lithography equipment configured to generate using the sequence of sparse images a plurality of patterned light sheet on the polymer resist with a temporally-focused femtosecond pulse, where the light sheet has patterns.

In some embodiments, the plurality of interspersed features stored in a sequence of sparse images, when projected to the polymer resist, generate a 3D structure that can mitigate proximity effects for densely packed features.

In some embodiments, the sequence of sparse images has a selected pattern period higher than half of the sum of the width of a focal spot and the width of a polymerized feature (generated by the interspersed features of the pattern).

In some embodiments, the duration, intensity, and/or size of the focused light spot of the femtosecond pulse are determined based on an optical dosage per pulse ($D_p$) model.

In some embodiments, the lithography equipment configured to generate using the sequence of sparse images, a second plurality of patterned light sheet with a temporally-focused femtosecond pulse on a second layer of polymer resist (to form the 3D structure), the light sheet having sub-micrometer patterns.

In some embodiments, the system is a P-TPL system configured to generate a 3D structure with features less than 300 nm, pores finer than 700 nm, and at rates greater than 0.5 mm$^2$/s per layer.

In some embodiments, the system is a P-TPL system configured to generate a 3D structure with features less than 300 nm (e.g., 0 nm to 300 nm).

In some embodiments, the system is a P-TPL system configured to generate a 3D structure with features having pores less than 700 nm (e.g., where the features are not fully dense depending on the size of the light spot and up to 700 nm).

In some embodiments, the system is a P-TPL configured to generate a 3D structure at rates greater than 0.5 mm$^2$/s per layer.

In some embodiments, the polymer resist includes at least a photoinitiator, a radical quencher, and a monomer, where the monomer concentration of the photoinitiator is less than one-third the concentration of the radical quencher.

In some embodiments, the radical quencher includes dissolved oxygen.

In some embodiments, the solubility threshold DOC of the resist is less than 10%.

According to yet another aspect, the present disclosure relates to a polymer resist. In one embodiment, the polymer resist includes: at least a photoinitiator, a radical quencher, and a monomer, where the concentration of the photoinitiator is less than one-third the concentration of the radical quencher.

In some embodiments, the radical quencher includes dissolved oxygen.

In some embodiments, the solubility threshold DOC of the resist is less than 10%.

It should be understood that the examples described herein are only non-limiting examples, and that embodiments of the present disclosure can be used for a variety of additive manufacturing techniques.

Additional advantages of the disclosed systems and methods will be set forth in part in the description which follows and in part will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and is not restrictive of the disclosed compositions and methods, as claimed.

Throughout the description and claims of this specification, the word "comprise" and other forms of the word, such as "comprising" and "comprises," means including but not limited to, and is not intended to exclude, for example, other additives, components, integers, or steps.

BRIEF DESCRIPTION OF DRA WINGS

The details of one or more embodiments of the invention are set forth in the accompanying drawings and the description below. Other features, objects, and advantages of the invention will be apparent from the description and drawings and from the claims.

FIGS. 1A-1E depict additive manufacturing of dense 3D structures with sub-micrometer features and porosities via the sequential projection of interspersed sparse images. Specifically, FIG. 1A shows a schematic of projection two-photon lithography (P-TPL). FIGS. 1B-1C show densely packed digital image (FIG. 1B) vs. two sparse images with interspersed line features that when superimposed generate a composite image identical to the dense image (FIG. 1C). FIGS. 1D-1E show Scanning electron microscopy (SEM) image of a solid printed structure resulting from the projection of the dense image (FIG. 1D) vs. nanoporous 3D structure resulting from the projection of the sequence of sparse interspersed images (FIG. 1E).

FIGS. 2A and 2B each show a method that can perform rapid nanoscale 3D printing of large and deterministic 3D structures with sub-micrometer features and porosities.

FIGS. 3A-3D depict computationally evaluated optical dosage profile for sparse vs dense projections. Specifically, FIG. 3A shows a representative image of projected periodic line pattern. FIGS. 3B-3D show peak intensity distribution (FIG. 3B), dosage per pulse (FIG. 3C), and pulse width in the focal volume (FIG. 3D). Light propagates along the z-axis and a periodic line pattern comprising 5 lines of width 5 pixels and period 30 pixels was projected for FIGS. 3B-3D. Each pixel maps to 113 nm at the focal plane.

FIG. 3E depicts pulse shape, represented as instantaneous intensity versus time, at the focal plane (z=0) and 1 μm away from the focal plane (z=1). 'Structured' projections were projections of periodic line pattern images comprising a total of 15 lines with a width of 5 pixels and a period of 10 pixels. 'Unstructured' projections were projections of 150-pixel wide fully-illuminated images.

FIG. 3F shows dosage vs. axial z-distance for three different projected images. FIG. 3G shows dosage vs lateral x-distance for the same three projected images. (5,30) refers to sparse periodic line pattern image of 30-pixel period and 5-pixel linewidth whereas (5,10) refers to a dense image with 10-pixel period and 5-pixel linewidth. Fully dense refers to an image with all pixels illuminated. Each pixel maps to 113 nm at the focal plane.

FIGS. 4A-4D depict the predicted degree of polymer conversion (DOC) under various projections and resist compositions generated from FEM. Specifically, FIG. 4A shows predictions for sparse periodic lines of 30-pixel period and 5-pixel width under realistic initial $O_2$ concentration of $6 \times 10^{-3}$ mol $dm^{-3}$. FIG. 4B shows predictions for sparse periodic lines of 30-pixel period and 5-pixel width under low initial $O_2$ concentration of $3 \times 10^{-4}$ mol $dm^{-3}$. FIG. 4C shows predictions for projection of dense lines of 10-pixel period and 5-pixel width. FIG. 4D shows predictions for sequential projection of two interspersed sparse patterns of 20-pixel period and 5-pixel width. Initial $O_2$ concentration was $6 \times 10^{-3}$ mol $dm^{-3}$ for both FIG. 4C and FIG. 4D. Each image was projected for 3.2 ms and the DOC was observed after it reached steady state (after 1000 ms for FIG. 4B and 200 ms for FIG. 4A, FIG. 4C, FIG. 4D). In FIG. 4D, there was no time delay between the end of projection of the first image and the beginning of projection of the next image.

FIGS. 5A-5D depict spatiotemporal evolution of oxygen concentration in the vicinity of the center of the central line after exposure of a periodic line pattern of 30-pixel period and 5-pixel width for a duration of 3.2 ms (i.e., 16 pulses). Specifically, FIGS. 5A-5B show evolution for a photoresist with initial $O_2$ concentration (i.e., $[O_2]_o$)=$6 \times 10^{-3}$ mol $dm^{-3}$. FIGS. 5C-5D show evolution for a photoresist with $[O_2]$=$3 \times 10^{-4}$ mol $dm^{-3}$.

Figures 6A, 6B:
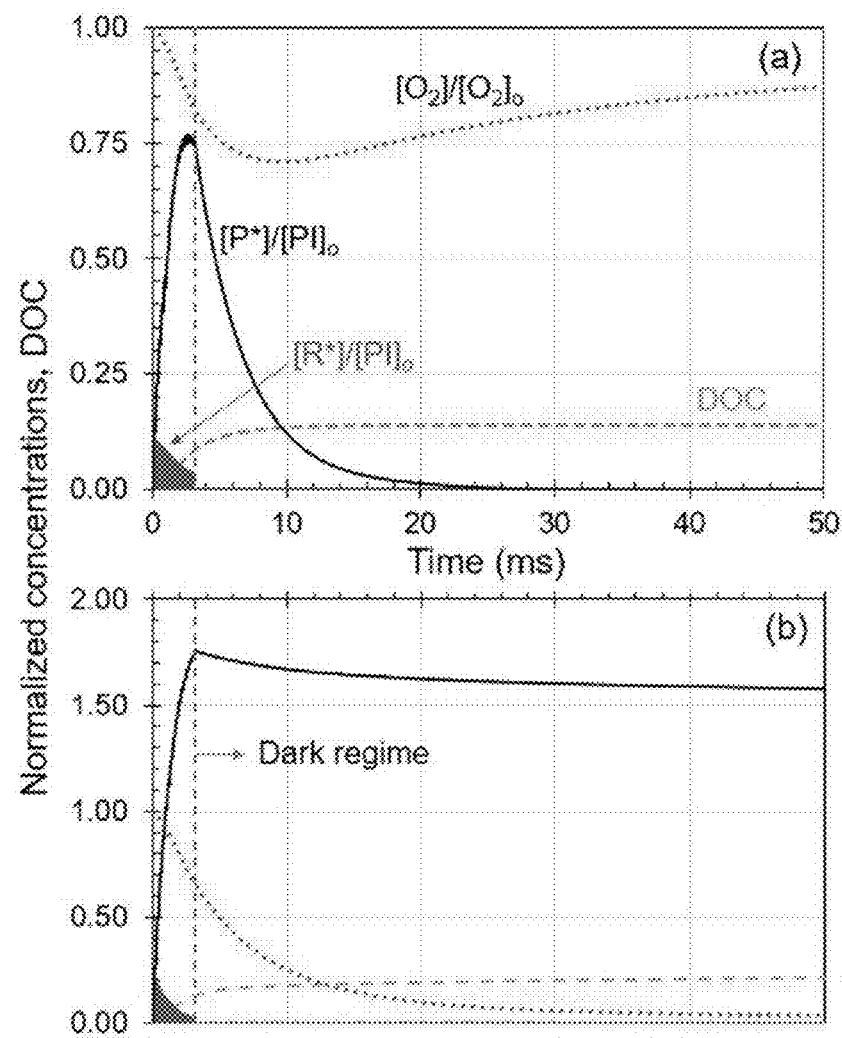

FIGS. 6A-6B depict temporal evolution of the concentration of the chemical species at the center of the central projected line upon illumination of a periodic line pattern of 30-pixel period and 5-pixel width for a duration of 3.2 ms (i.e., 16 pulses). Specifically, FIG. 6A shows evolution for a photoresist with realistic initial $O_2$ concentration (i.e., $[O_2]_o$) of $6 \times 10^{-3}$ mol $dm^{-3}$. FIG. 6B shows evolution for a hypothetical photoresist with low initial $O_2$ concentration of $3 \times 10^{-4}$ mol $dm^{-3}$. $[PI]_o$=$1.65 \times 10^{-3}$ mol $dm^{-3}$ for both photoresists.

Figures 7A, 7B, 7C, 7D, 7E, 7F:
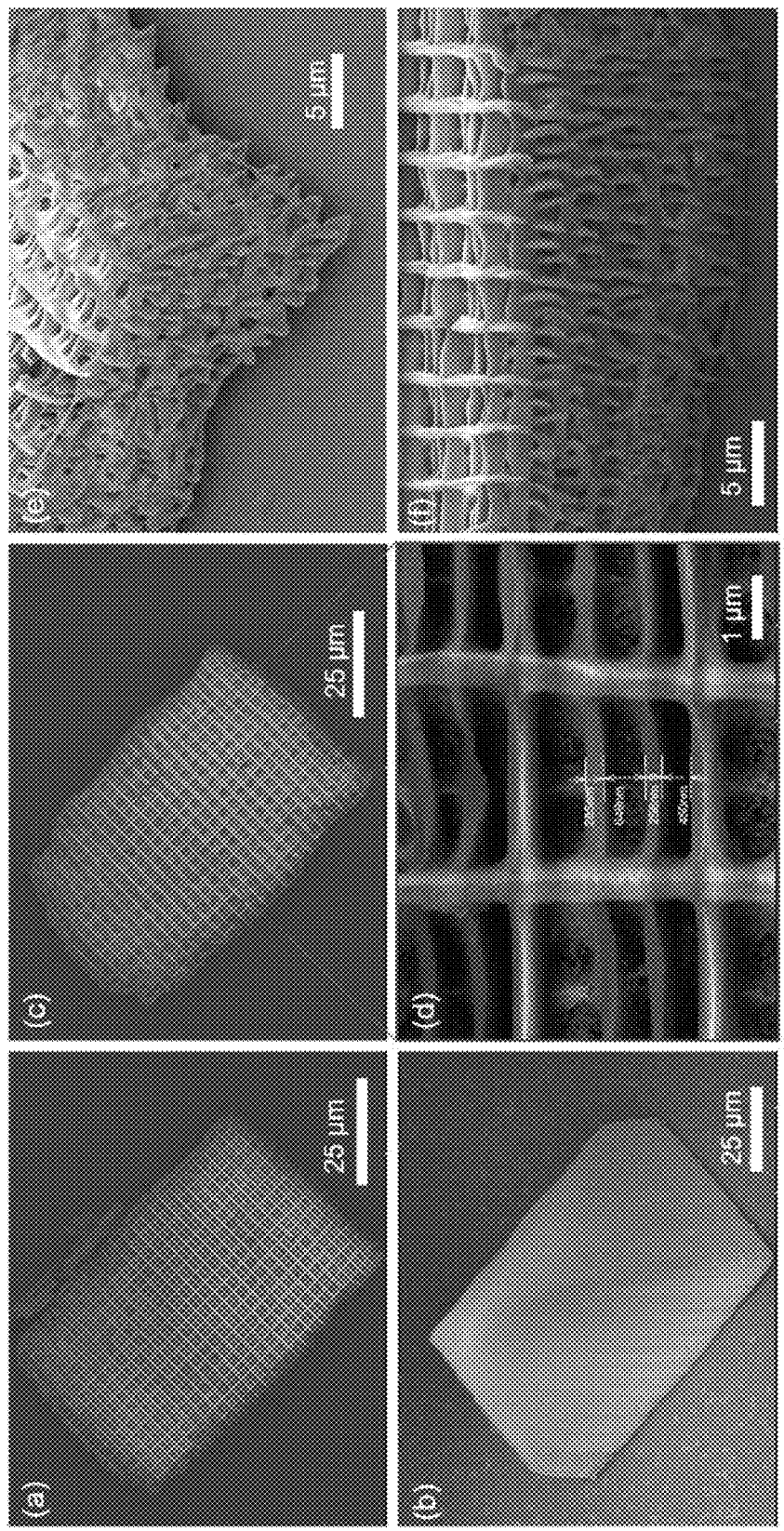

FIGS. 7A-7F depict woodpile 3D structures printed with sparse vs dense projections. Specifically, FIG. 7A shows a porous structure with >1 μm lateral pores generated by projecting periodic line patterns of 30-pixel period and 5-pixel width for a duration of 3.2 ms per layer. FIG. 7B shows a solid structure generated by projecting a pattern with 10-pixel period and 5-pixel width for a duration of 3 ms per layer. FIG. 7C shows a nanoporous 3D structure generated by projecting three interspersed periodic line patterns in each layer wherein each pattern had a 30-pixel period and 5-pixel linewidth and was projected for 3.2 ms. FIGS. 7D-7F show a close-up of top and side views of the nanoporous 3D structure in FIG. 7C.

Figure 7G:
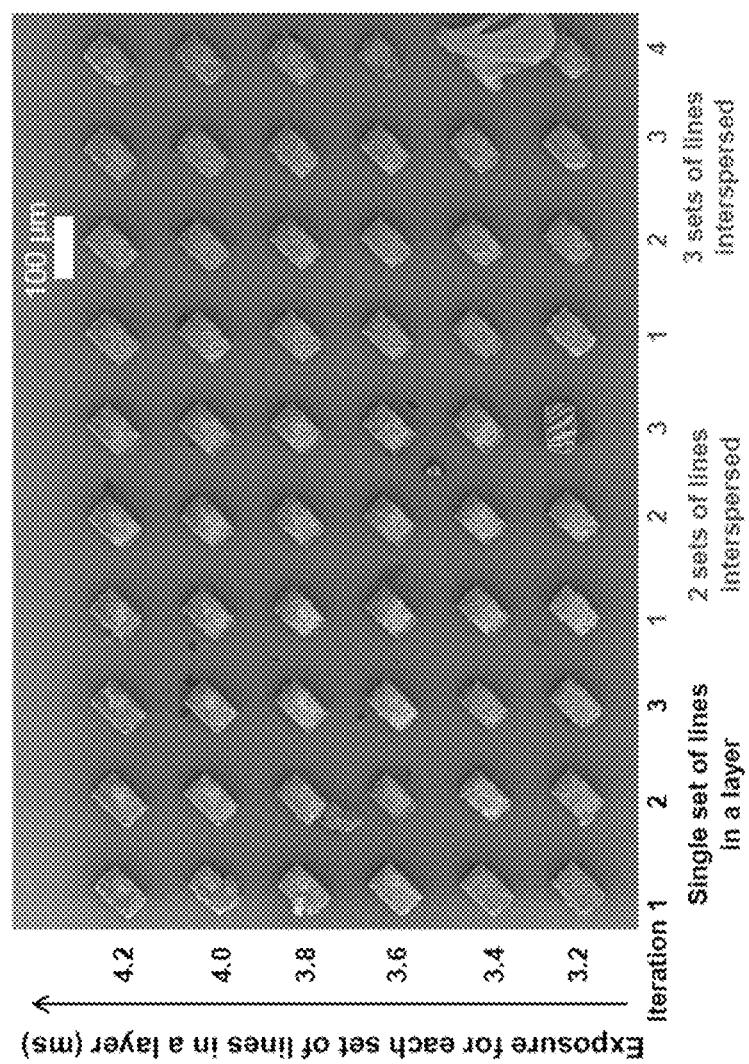

FIG. 7G depicts scanning electron micrographs of woodpiles printed at various exposures and interspersing techniques. Three-to-four replicates were printed for each combination of parameters. In each layer, periodic line patterns had a period of 30 pixels and contained 5-pixel wide lines. The length of the projection was 800 pixels and the width was 515 pixels. Upon projection, each pixel was mapped to 113 nm at the focal plane. Each structure comprised a total of 40 layers and the layers were stacked vertically at a spacing of 900 nm. After exposing each layer, the z-stage was moved from one layer to the next layer within 12 ms.

Figures 8A, 8B, 8C, 8D:
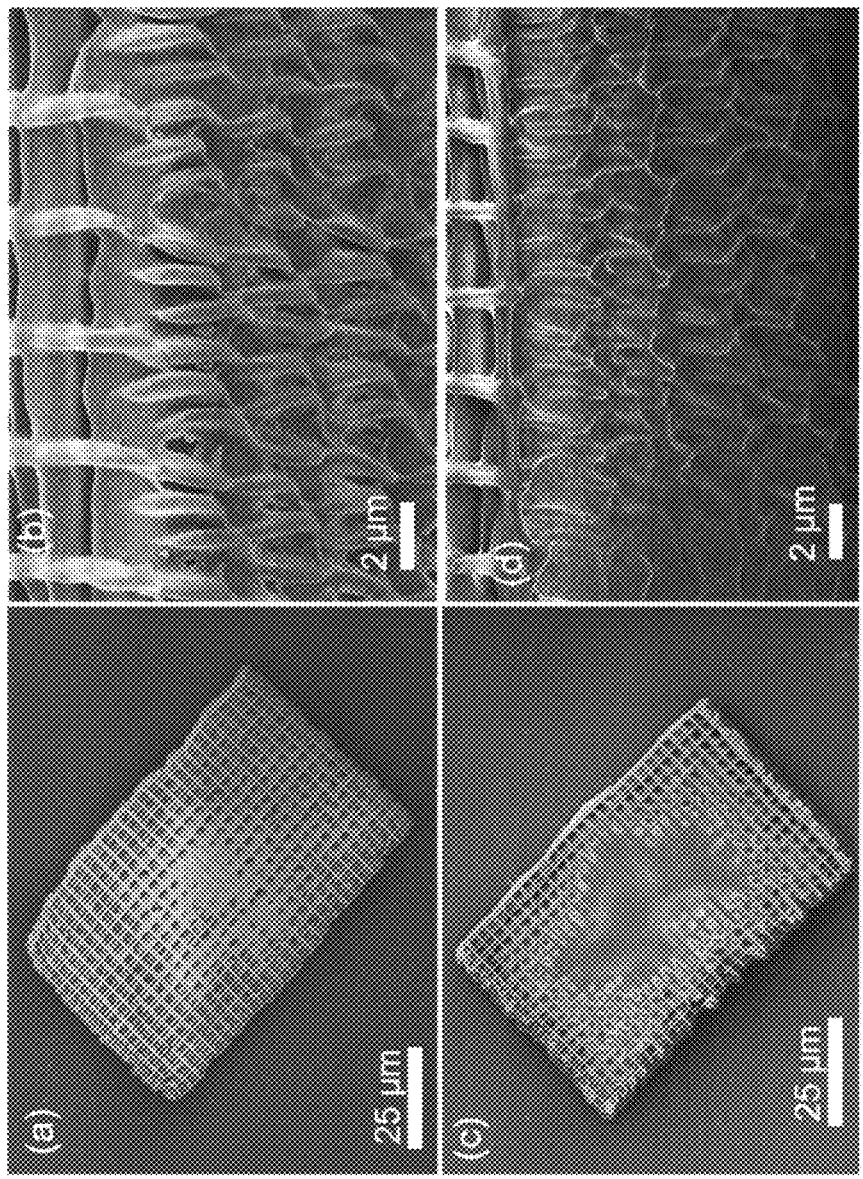

FIGS. 8A-8B show top and side views of the mildly over-polymerized structure printed with the resist that was degassed for 30 min.

FIGS. 8C-8D show views of severely over-polymerized structure printed with the resist that was degassed for 60 min. Both structures were generated by projecting three interspersed periodic line patterns in each layer wherein each pattern had a 30-pixel period and 5-pixel linewidth and was projected for 3.2 ms.

DETAILED DESCRIPTION

To facilitate an understanding of the principles and features of various embodiments of the present invention, they are explained hereinafter with reference to their implementation in illustrative embodiments.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth set of one or more references in the list. All references cited and discussed in this specification are incorporated herein by reference in their entirety and to the same extent as if each reference was individually incorporated by reference.

Example System and Method

Figures 1A, 1B, 1C, 1D, 1E:
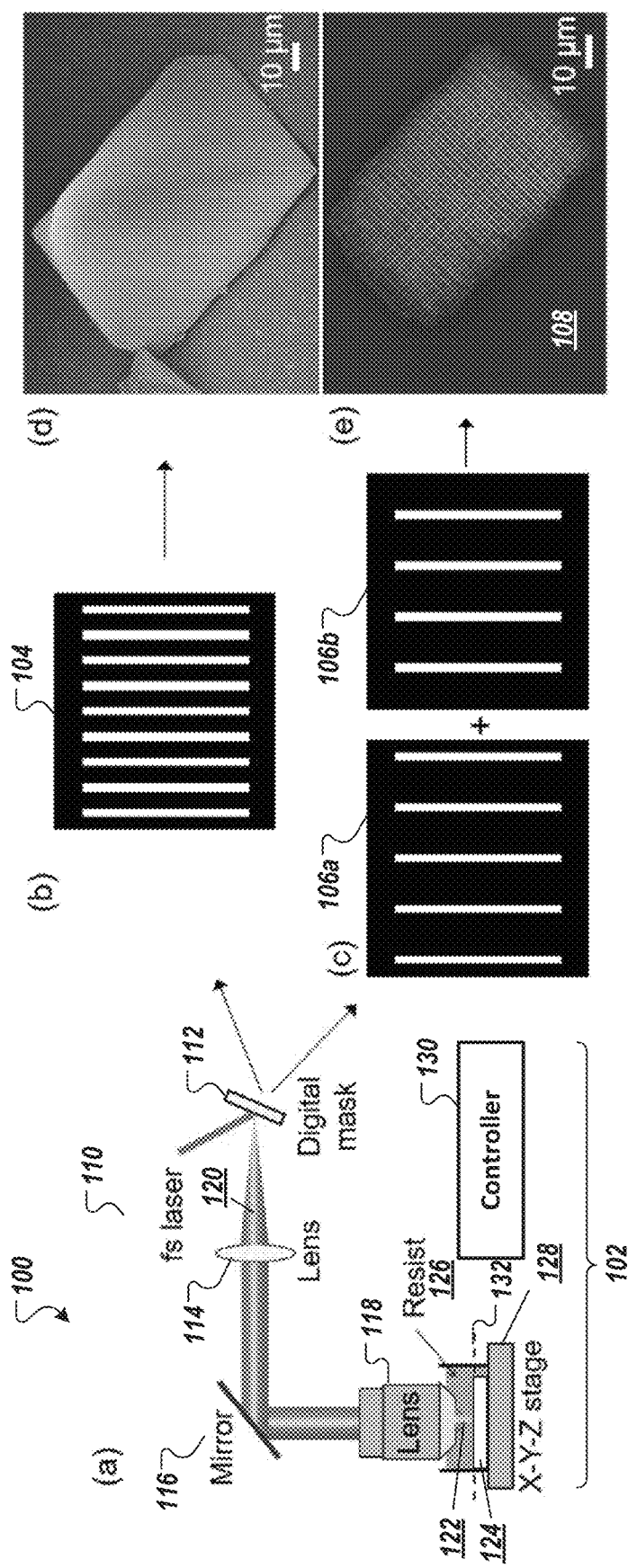

FIG. 1A shows an additive manufacturing system 100 comprising a two-photon lithography (P-TPL) projection device 102 configured to apply sequential projection (shown combined as 104) of interspersed sparse images 106 (shown as 106a, 106b) in the fabrication of dense 3D structures 108 with sub-micrometer features and porosities. FIG. 1B shows a densely packed digital image, and FIG. 1C shows two sparse images with interspersed line features that, when superimposed, generate a composite image identical to the dense image of FIG. 1B. FIG. 1D shows a scanning electron microscopy (SEM) image of a solid printed structure resulting from the projection of the dense image (FIG. 1B). FIG. 1E shows a nanoporous 3D structure resulting from the projection of the sequence of sparse interspersed images (FIG. 1E).

In the example shown in FIG. 1A, the two-photon lithography (P-TPL) projection device 102 includes a laser source 110 (shown as a femtosecond (fs) laser 114), digital mask 112, lens 114, mirror 116, and objective lens 118. The lithography equipment 102 is configured to generate, using the sequence of sparse images a plurality of patterned light sheets on the polymer resist with a temporally-focused femtosecond pulse, where the light sheet has sub-micrometer patterns. It is considered that, in alternative embodiments, the light sheet can have larger patterns (i.e., micrometer, millimeter, or centimeter scale). It is also considered that the projection device can, in other embodiments, be configured for projection stereolithography, micro-projection stereolithography, or projection-based vat photopolymerization.

The femtosecond laser 114 generates laser pulses that are directed to the digital mask 114 configured to provide a sequence of projection images (e.g., 106) of interspersed features for a 3D structure. The time-varying interspersed sparse projections 120 are directed through the optics systems comprising lens 114, mirrors 116 to the objective lens 118 to direct the projection 122 to a workpiece 124 having photoresist 126 layered thereon, to generate closely spaced fine features on a polymer resist. The workpiece 124 can be a platform 128 (shown as "X-Y-Z stage" 128).

As used herein, the term "interspersed features" refers to a sequence or series of "features" (i.e., 2D or 3D patterns, shapes, or elements that can be constructed or modeled on a 2D or 3D structure) which is arranged from two or more sets of features, the features of the two or more sets arranged in an approximately alternating order. Each of the two or more sets can be represented as a "sparse image," in which the features of said set are represented in the absence of the features of any other set. When the sparse images representing all sets are superimposed, the subsequent image depicts all of the interspersed features. The features of each set can be further spaced apart than the interspersed features, which can improve the resolution of the interspersed features when generated on the polymer resist.

A "temporally-focused" femtosecond pulse, as the term is used herein, is a pulse, particularly a light pulse or other electromagnetic pulses, having a duration on a femtosecond scale in which the pulse is first expanded (i.e., the duration of the pulse is increased) before the pulse is spatially focused, then the pulse is compressed (i.e., its duration is shortened) at the spatial focal plane of the pulse, and finally it is stretched again as the pulse propagates away from the spatial focal plane. In some embodiments, temporal focusing is achieved by illuminating a diffractive optical element (such as the digital mask) with the femtosecond pulse. One of the diffracted beams from the mask can be collected using a lens, and the collimated beam can be focused using another lens.

A workpiece can be any partially finished or partially fabricated article of manufacture, e.g., in a semiconductor device, a semiconductor substrate, a micro-electromechanical component, or a microfluidic chip, to which a closely spaced fine feature is desired. In some embodiments, the article of manufacture may be a part of a microprocessor (e.g., processor, microcontroller, digital signal processor, FPGA, ASIC), memory storage (SRAM, MRAM, etc.), photovoltaic, electronic device interconnection (e.g., flexible circuit board), antenna modules, passive electronic components, or sensor (e.g., acoustic sensor, mechanical cantilever, etc.). The workpiece can be a part of a micro-robotic device, micro-fluidic component, scaffolds for biomedical applications, mechanical metamaterials for lightweight structural materials in transport applications, photonic components for information processing, or structured electrodes for energy storage, as a non-limiting example.

In some such embodiments, the two lenses are employed to form a 4f-like optical system. A "4f-like optical system" is one in which the digital mask is one focal length distance away from the collimating lens, the focusing and collimating lens are separated by the sum of their focal lengths, and the plane where the femtosecond pulse is temporally focused is one focal length away from the focusing lens.

A controller 130 coordinates the operation of the laser 110, the mask 112, and the platform 128, e.g., in providing a stream of images 106 to the projected to be displayed by the mask 112 in concert with the laser pulsing and the platform movement. The controller 130 includes a memory having instructions for the plurality of interspersed features for a 3D structure to project as a sequence of sparse images (e.g., 106) on a focal plane 132 to generate closely spaced fine features on the polymer resist 126, that can mitigate proximity effects for densely packed features. An example of densely packed features is a geometric shape less than 300 nm with pores finer than 700 nm. The system 100 is configured to generate such features at a rate greater than 0.5 mm2/s per layer.

The projection device 102 is configured to project a light sheet to polymerize only a thin layer of the photopolymer without polymerizing excess material above or below the focal plane, relying on spatial and temporal focusing of femtosecond light to generate nonlinear intensity gradients along the depth direction. The objective lens may be disposed within the photoresist through an oil immersion. The photoresist may be configured with a low concentration of photoinitiator to provide for lower chemical proximity effects.

The duration, intensity, and/or size of the focused light spot of the femtosecond pulse can be finely controlled, e.g., based on an optical dosage per pulse model.

In some embodiments, the sequence of sparse images can have a selected pattern period higher than half (e.g., higher than 0.5 times, higher than 0.55 times, higher than 0.6 times, higher than 0.65 times, higher than 0.7 times, higher than 0.75 times, higher than 0.8 times, higher than 0.85 times, higher than 0.9 times, higher than 0.95 times) of the sum of the width of a focal spot and the width of a polymerized feature (generated by the interspersed features of the pattern).

A detailed example of a configuration is provided herein. Detailed description of an example lithography projection device that may be employed is provided in Saha et al., 2019.

In some embodiments, the system (e.g., 100) can generate a 3D structure with features less than 300 nm (e.g., less than 280 nm, less than 260 nm, less than 240 nm, less than 220 nm, less than 200 nm, less than 180 nm, less than 160 nm, less than 140 nm, less than 120 nm, less than 100 nm, less than 80 nm, less than 60 nm, less than 40 nm, less than 20 nm). In some embodiments, the system can be a P-TPL system configured to generate a 3D structure with features greater than 0 nm (e.g., greater than 20 nm, greater than 40 nm, greater than 60 nm, greater than 80 nm, greater than 100 nm, greater than 120 nm, greater than 140 nm, greater than 160 nm, greater than 180 nm, greater than 200 nm, greater than 220 nm, greater than 240 nm, greater than 260 nm, greater than 280 nm), discussed above. In some embodiments, the system can be a P-TPL system configured to generate a 3D structure with features of about 300 nm.

It is considered that the system can be a P-TPL system configured to generate a 3D structure with features ranging from any of the minimum values described above to any of the maximum values described above. For example, in some embodiments, the system can be a P-TPL system configured to generate a 3D structure with features from 0 nm to 300 nm (e.g., from 20 nm to 280 nm, from 40 nm to 260 nm, from 60 nm to 240 nm, from 80 nm to 220 nm, from 100 nm to 200 nm, from 120 nm to 180 nm, from 140 nm to 160 nm, from 0 nm to 160 nm, from 20 nm to 140 nm, from 40 nm to 120 nm, from 60 nm to 100 nm, from 140 nm to 300 nm, from 160 nm to 280 nm, from 180 nm to 260 nm, from 200 nm to 240 nm), as discussed above.

In some embodiments, the system is a P-TPL system configured to generate a 3D structure with features having pores less than 700 nm (e.g., less than 675 nm, less than 650 nm, less than 625 nm, less than 600 nm, less than 575 nm, less than 550 nm, less than 525 nm, less than 500 nm, less than 475 nm, less than 450 nm, less than 425 nm, less than 400 nm, less than 375 nm, less than 350 nm, less than 325 nm, less than 300 nm, less than 275 nm, less than 250 nm, less than 225 nm, less than 200 nm, less than 175 nm, less than 150 nm, less than 125 nm, less than 100 nm) (e.g., where the features are not fully dense depending on the size of the light spot and up to 700 nm). In some embodiments, the system can be a P-TPL system configured to generate a 3D structure with features having pores up to 100 nm (e.g., up to 125 nm, up to 150 nm, up to 175 nm, up to 200 nm, up to 225 nm, up to 250 nm, up to 275 nm, up to 300 nm, up to 325 nm, up to 350 nm, up to 375 nm, up to 400 nm, up to 425 nm, up to 450 nm, up to 475 nm, up to 500 nm, up to 525 nm, up to 550 nm, up to 575 nm, up to 600 nm, up to 625 nm, up to 650 nm, up to 675 nm, up to 700 nm). In some embodiments, the system can be a P-TPL system configured to generate a 3D structure with features having pores of about 700 nm.

It is considered that the system can be a P-TPL system configured to generate a 3D structure with features having pores ranging from any of the minimum values described above to any of the maximum values described above. For example, in some embodiments, the system can be a P-TPL system configured to generate a 3D structure with features having pores from 100 nm to 700 nm (e.g., from 125 nm to 675 nm, from 150 nm to 650 nm, from 175 nm to 625 nm, from 200 nm to 600 nm, from 225 nm to 575 nm, from 250 nm to 550 nm, from 275 nm to 525 nm, from 300 nm to 500 nm, from 325 nm to 475 nm, from 350 nm to 450 nm, from 375 nm to 425 nm, from 100 nm to 400 nm, from 125 nm to 375 nm, from 150 nm to 350 nm, from 175 nm to 325 nm, from 200 nm to 300 nm, from 225 nm to 275 nm, from 400 nm to 700 nm, from 425 nm to 675 nm, from 450 nm to 650 nm, from 475 nm to 625 nm, from 500 nm to 600 nm, from 525 nm to 575 nm).

In some embodiments, the system is a P-TPL configured to generate a 3D structure at rates greater than 0.5 mm$^2$/s per layer (e.g., greater than 0.6 mm$^2$/s per layer, greater than 0.7 mm$^2$/s per layer, greater than 0.8 mm$^2$/s per layer, greater than 0.9 mm$^2$/s per layer, greater than 1 mm$^2$/s per layer, greater than 1.1 mm$^2$/s per layer, greater than 1.2 mm$^2$/s per layer, greater than 1.3 mm$^2$/s per layer, greater than 1.4 mm$^2$/s per layer, greater than 1.5 mm$^2$/s per layer, greater than 1.6 mm$^2$/s per layer, greater than 1.7 mm$^2$/s per layer, greater than 1.8 mm$^2$/s per layer, greater than 1.9 mm$^2$/s per layer, greater than 2 mm$^2$/s per layer). In some embodiments, the system can be a P-TPL configured to generate a 3D structure at rates up to 2 mm$^2$/s per layer (e.g., up to 1.9 mm$^2$/s per layer, up to 1.8 mm$^2$/s per layer, up to 1.7 mm$^2$/s per layer, up to 1.6 mm$^2$/s per layer, up to 1.5 mm$^2$/s per layer, up to 1.4 mm$^2$/s per layer, up to 1.3 mm$^2$/s per layer, up to 1.2 mm$^2$/s per layer, up to 1.1 mm$^2$/s per layer, up to 1 mm$^2$/s per layer, up to 0.9 mm$^2$/s per layer, up to 0.8 mm$^2$/s per layer, up to 0.7 mm$^2$/s per layer, up to 0.6 mm$^2$/s per layer, up to 0.5 mm$^2$/s per layer). In some embodiments, the system can be a P-TPL configured to generate a 3D structure at rates of about 0.5 mm$^2$/s per layer.

It is considered that the system can be a P-TPL configured to generate a 3D structure at rates ranging from any of the minimum values described above to any of the maximum values described above. For example, in some embodiments, the system can be a P-TPL configured to generate a 3D structure at rates from 0.5 mm$^2$/s per layer to 2 mm$^2$/s per layer (e.g., from 0.6 mm$^2$/s per layer to 1.9 mm$^2$/s per layer, from 0.7 mm$^2$/s per layer to 1.8 mm$^2$/s per layer, from 0.8 mm$^2$/s per layer to 1.7 mm$^2$/s per layer, from 0.9 mm$^2$/s per layer to 1.6 mm$^2$/s per layer, from 1 mm$^2$/s per layer to 1.5 mm$^2$/s per layer, from 1.1 mm$^2$/s per layer to 1.4 mm$^2$/s per layer, from 1.2 mm$^2$/s per layer to 1.3 mm$^2$/s per layer, from 0.5 mm$^2$/s per layer to 1.3 mm$^2$/s per layer, from 0.6 mm$^2$/s per layer to 1.2 mm$^2$/s per layer, from 0.7 mm$^2$/s per layer to 1.1 mm$^2$/s per layer, from 0.8 mm$^2$/s per layer to 1 mm$^2$/s per layer, from 1.2 mm$^2$/s per layer to 2 mm$^2$/s per layer, from 1.3 mm$^2$/s per layer to 1.9 mm$^2$/s per layer, from 1.4 mm$^2$/s per layer to 1.8 mm$^2$/s per layer, from 1.5 mm$^2$/s per layer to 1.7 mm$^2$/s per layer), as discussed above.

In some embodiments, the polymer resist can include at least a photoinitiator, a radical quencher, and a monomer, where the monomer concentration of the photoinitiator can be less than one-third (e.g., less than 0.32 times less than 0.3 times, less than 0.28 times, less than 0.26 times, less than 0.24 times, less than 0.22 times, less than 0.2 times, less than 0.18 times, less than 0.16 times, less than 0.14 times, less than 0.12 times, less than 0.1 times, less than 0.08 times, less than 0.06 times, less than 0.05 times) the concentration of the radical quencher.

Figure 3A:
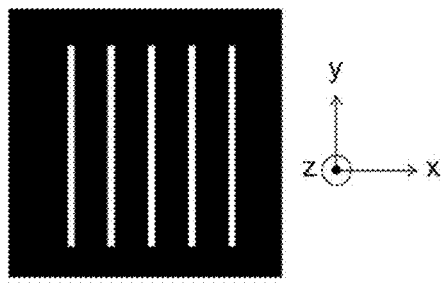
Figure 3B:
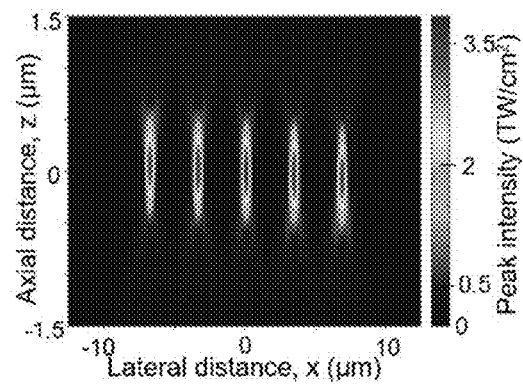
Figure 3C:
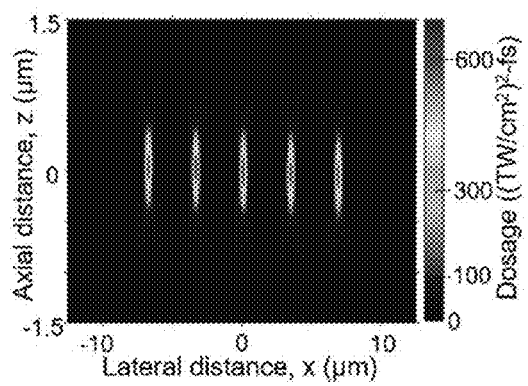
Figure 3D:
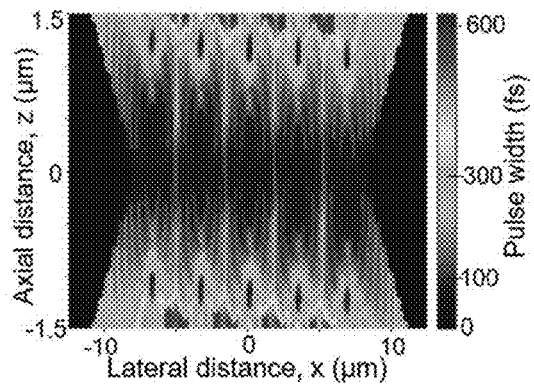
Figure 3E:
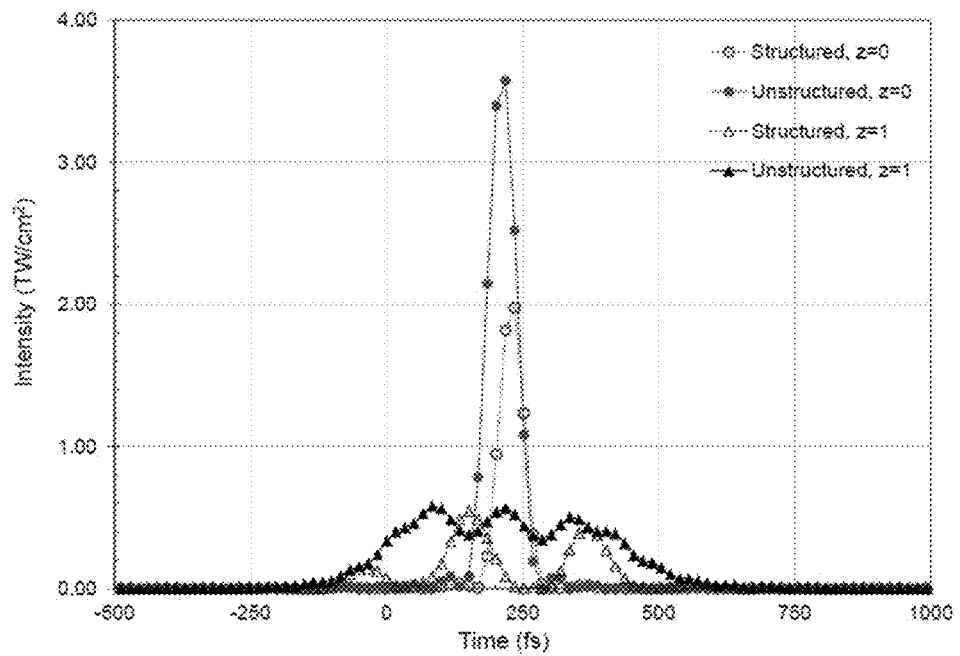

FIGS. 3A-3D show an optical dosage profile for sparse and dense projections. Specifically, FIG. 3A shows a representative image of the projected periodic line pattern. FIGS. 3B-3D show peak intensity distribution (FIG. 3B), dosage per pulse (FIG. 3C), and pulse width in the focal volume (FIG. 3D). In FIGS. 3B-3D, light is propagated along the z-axis and a periodic line pattern comprising 5 lines of width 5 pixels and period 30 pixels. Each pixel maps to 113 nm at the focal plane. FIG. 3E depicts an example pulse shape, represented as instantaneous intensity versus time, at the focal plane (z=0) and 1 μm away from the focal plane (2=1). 'Structured' projections were projections of periodic line pattern images comprising a total of 15 lines with a width of 5 pixels and a period of 10 pixels. 'Unstructured' projections were projections of 150-pixel wide fully-illuminated images.

Figure 3F:
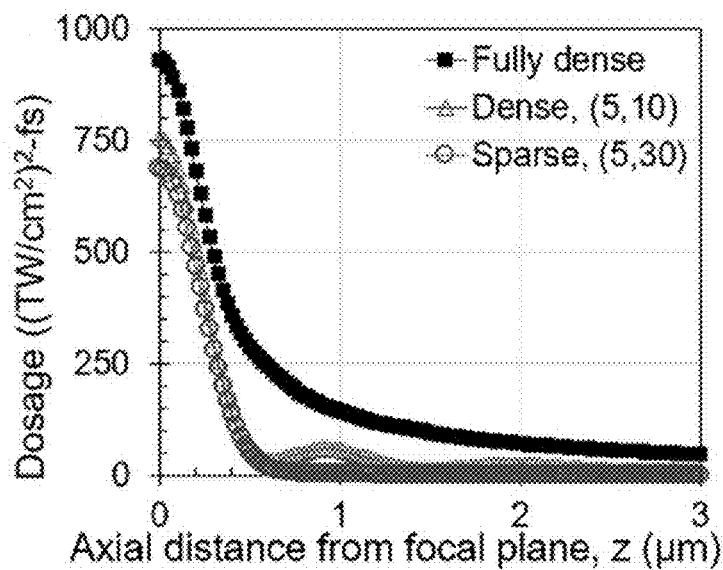
Figure 3G:
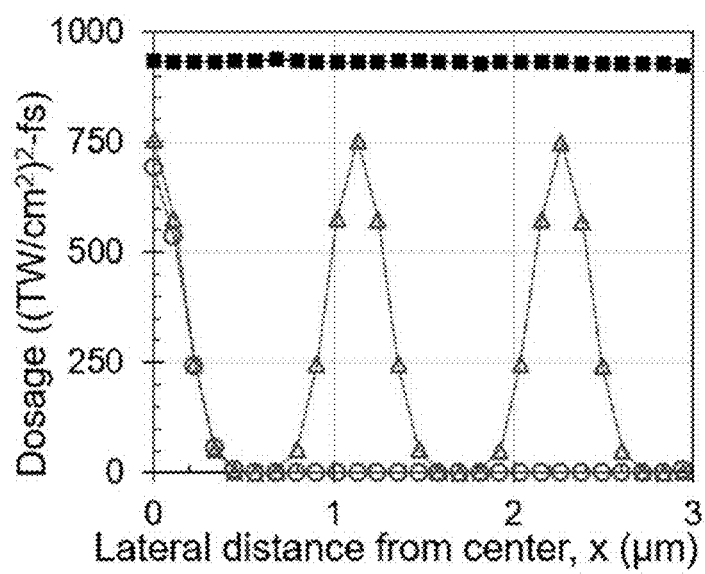

FIG. 3F shows dosage vs. axial z-distance for three different projected images. FIG. 3G shows dosage vs lateral x-distance for the same three projected images. (5,30) refers to a sparse periodic line pattern image of a 30-pixel period and 5-pixel linewidth, whereas (5,10) refers to a dense image with a 10-pixel period and 5-pixel linewidth. Fully dense refers to an image with all pixels illuminated. Each pixel maps to 113 nm at the focal plane.

Example Polymer Resist. The system (e.g., 100) can operate with a photoinitiator can include 4,4'-((1E,1'E)-(2-((2-Ethylhexyl)oxy)-5-methoxy-1,4-phenylene)bis(ethene-2,1-diyl))bis (N,N-dibutylaniline), or any other suitable TPL photoinitiator or any combination thereof. In some embodiments, the radical quencher can include dissolved oxygen, 4-methoxyphenol, or any other suitable radical quencher or any combination thereof. In some embodiments, the monomer can include acrylates, alkenes, epoxides, or any other suitable monomer or any combination thereof.

In some embodiments, the solubility threshold DOC of the resist can be less than 10% (e.g., less than 9.5%, less than 9%, less than 8.5%, less than 8%, less than 7.5%, less than 7%, less than 6.5%, less than 6%, less than 5.5%, less than 5%, less than 4.5%, less than 4%, less than 3.5%, less than 3%, less than 2.5%, less than 2%, less than 1.5%, less than 1%). In some embodiments, the solubility threshold DOC can be up to 1% (e.g., up to 1.5%, up to 2%, up to 2.5%, up to 3%, up to 3.5%, up to 4%, up to 4.5%, up to 5%, up to 5.5%, up to 6%, up to 6.5%, up to 7%, up to 7.5%, up to 8%, up to 8.5%, up to 9%, up to 9.5%, up to 10%).

It is considered that the solubility threshold DOC can range from any of the minimum values described above to any of the maximum values described above. For example, in some embodiments, the solubility threshold DOC can be from 1% to 10% (e.g., from 1.5% to 9.5%, from 2% to 9%, from 2.5% to 8.5%, from 3% to 8%, from 3.5% to 7.5%, from 4% to 7%, from 4.5% to 6.5%, from 5% to 6%, from 1% to 5.5%, from 1.5% to 5%, from 2% to 4.5%, from 2.5% to 4%, from 3% to 3.5%, from 5.5% to 10%, from 6% to 9.5%, from 6.5% to 9%, from 7% to 8.5%, from 7.5% to 8%).

An example polymer resist that can operate with the system includes, at least a photoinitiator, a radical quencher, and a monomer, where the concentration of the photoinitiator can be less than one-third (e.g., less than 0.32 times less than 0.3 times, less than 0.28 times, less than 0.26 times, less than 0.24 times, less than 0.22 times, less than 0.2 times, less than 0.18 times, less than 0.16 times, less than 0.14 times, less than 0.12 times, less than 0.1 times, less than 0.08 times, less than 0.06 times, less than 0.05 times) the concentration of the radical quencher.

In some embodiments, the photoinitiator can include 4,4'-((1E,1'E)-(2-((2-Ethylhexyl)oxy)-5-methoxy-1,4-phenylene)bis(ethene-2,1-diyl))bis(N,N-dibutylaniline), or any other suitable TPL photoinitiator or any combination thereof.

In some embodiments, the radical quencher can include dissolved oxygen, 4-methoxyphenol, or any other suitable radical quencher or any combination thereof. In some embodiments, the monomer can include acrylates, alkenes, epoxides, or any other suitable monomer or any combination thereof.

Example Method. FIGS. 2A and 2B each show a method 200 (shown as 200a and 200b, respectively), e.g., additive manufacturing method, e.g., two-photon lithography method or other lithographic method described herein, to perform rapid nanoscale 3D printing of large and deterministic 3D structures with sub-micrometer features and porosities. The printing operation can be employed for non sub-micrometer features and porosities.

In FIG. 2A, the method 200a includes retrieving (202) a plurality of interspersed features for a three-dimensional (3D) structure to project as a sequence of sparse images on the same plane to generate closely spaced fine features on a polymer resist. Method 200a (as well as 200b) then includes generating (204), using the stored sequence of sparse images, a plurality of patterned light sheet on the polymer resist with a temporally-focused femtosecond pulse, the light sheet having sub-micrometer patterns. In some embodiments, the method is performed in with the system as described in relation to FIG. 1A or additional examples provided herein. The sparse images may be stored and generated from a source pattern of a feature. The feature can then be divided to generate a sparser version of the pattern.

In FIG. 2B, the method 200b includes determining (206) a plurality of interspersed features for a three-dimensional (3D) structure to project as a sequence of sparse images on the same plane to generate closely spaced fine features on a polymer resist. Method 200b then includes generating (204), using the stored sequence of sparse images, a plurality of patterned light sheet on the polymer resist with a temporally-focused femtosecond pulse, the light sheet having sub-micrometer patterns. In some embodiments, the method is performed in with the system as described in relation to FIG. 1A or additional examples provided herein. In FIG. 2B, rather than pre-processing the source image to generate and then store the sparse images to be used by the digital light mask system, the controller (e.g., 130) is configured to divide the geometric shape of a feature in a pattern to a sparser version of same.

The plurality of interspersed features stored in a sequence of sparse images when projected to the polymer resist can generate a 3D structure that mitigates "proximity effects" (i.e., the merging of adjacent features) for densely packed features. In some embodiments, the features stored in the sequence of sparse images can be regularly spaced according to a selected "pattern period" (i.e., a repeated distance between individual features or groups of features). In some such embodiments, the sequence of sparse images can have a selected pattern period higher than half (e.g., higher than 0.5 times, higher than 0.55 times, higher than 0.6 times, higher than 0.65 times, higher than 0.7 times, higher than 0.75 times, higher than 0.8 times, higher than 0.85 times, higher than 0.9 times, higher than 0.95 times) of the sum of the width of a focal spot and the width of a polymerized feature (generated by the interspersed features of the pattern). In some embodiments, each sparse image can have the same selected pattern period. In other embodiments, each sparse image can have a different selected pattern period. In yet other embodiments, the features stored in the sequence of sparse images cannot be regularly spaced.

In some embodiments, duration, intensity, and/or size of the focused light spot of the femtosecond pulse can be determined based on an optical dosage per pulse model. The term "optical dosage per pulse," as used herein, refers to the time integral of the square of the instantaneous intensity over the duration of the pulse. Therefore, optical dosage per pulse model (e.g., $D_p$) can, in some embodiments, quantify the net optical input to the photopolymerization process from each pulse.

The method (e.g., 200a, 200b) can further include generating (204), using the sequence of sparse images, a plurality of patterned light sheets with a temporally-focused femtosecond pulse on a second layer of polymer resist (e.g., to form the 3D structure), the light sheet also having sub-micrometer patterns.

In some embodiments, the method is part of a P-TPL (projection two-photon lithography) operation, or other lithography operation described herein, configured to generate a 3D structure with features less than 300 nm, pores finer than 700 nm, and at rates greater than 0.5 mm$^2$/s per layer. "Two-photon lithography" or "TPL," as the term is used herein, refers to a photolithography technique whereby a photoresist is polymerized by a light source only at the focal point of the light source, which can be an area smaller than the total area irradiated by the light source. This relies on the phenomenon of "two-photon absorption" or "TPA," which refers to the state-altering or excitement of an atom or molecule by simultaneous absorption of two photons. The amount of TPA by an atom or molecule is proportional to the square of the intensity of the light source, which allows finer features to be defined than conventional lithography (i.e., the absorption of light in the periphery of the area irradiated by the light source has a lessened effect on the polymerization of the material in TPA than conventional lithography). "Projection-TPL" or "P-TPL," as the term is used herein, refers to the projection of a sheet of light, including millions of focused light spots, which allows an entire 2D layer of the photoresist to be processed at once.

In some embodiments, the method can be part of a P-TPL operation configured to generate a 3D structure with features less than 300 nm (e.g., less than 280 nm, less than 260 nm, less than 240 nm, less than 220 nm, less than 200 nm, less than 180 nm, less than 160 nm, less than 140 nm, less than 120 nm, less than 100 nm, less than 80 nm, less than 60 nm, less than 40 nm, less than 20 nm). In some embodiments, the method can be part of a P-TPL operation configured to generate a 3D structure with features greater than 0 nm (e.g., greater than 20 nm, greater than 40 nm, greater than 60 nm, greater than 80 nm, greater than 100 nm, greater than 120 nm, greater than 140 nm, greater than 160 nm, greater than 180 nm, greater than 200 nm, greater than 220 nm, greater than 240 nm, greater than 260 nm, greater than 280 nm). In some embodiments, the method can be part of a P-TPL operation configured to generate a 3D structure with features of about 300 nm.

It is considered that the method can be part of a P-TPL operation configured to generate a 3D structure with features ranging from any of the minimum values described above to any of the maximum values described above. For example, in some embodiments, the method can be part of a P-TPL operation configured to generate a 3D structure with features from 0 nm to 300 nm (e.g., from 20 nm to 280 nm, from 40 nm to 260 nm, from 60 nm to 240 nm, from 80 nm to 220 nm, from 100 nm to 200 nm, from 120 nm to 180 nm, from 140 nm to 160 nm, from 0 nm to 160 nm, from 20 nm to 140 nm, from 40 nm to 120 nm, from 60 nm to 100 nm, from 140 nm to 300 nm, from 160 nm to 280 nm, from 180 nm to 260 nm, from 200 nm to 240 nm).

In some embodiments, the method can be part of a P-TPL operation configured to generate a 3D structure with features having pores less than 700 nm (e.g., less than 675 nm, less than 650 nm, less than 625 nm, less than 600 nm, less than 575 nm, less than 550 nm, less than 525 nm, less than 500 nm, less than 475 nm, less than 450 nm, less than 425 nm, less than 400 nm, less than 375 nm, less than 350 nm, less than 325 nm, less than 300 nm, less than 275 nm, less than 250 nm, less than 225 nm, less than 200 nm, less than 175 nm, less than 150 nm, less than 125 nm, less than 100 nm) (e.g., where the features are not fully dense depending on the size of the light spot and up to 700 nm). In some embodiments, the method can be part of a P-TPL operation configured to generate a 3D structure with features having pores up to 100 nm (e.g., up to 125 nm, up to 150 nm, up to 175 nm, up to 200 nm, up to 225 nm, up to 250 nm, up to 275 nm, up to 300 nm, up to 325 nm, up to 350 nm, up to 375 nm, up to 400 nm, up to 425 nm, up to 450 nm, up to 475 nm, up to 500 nm, up to 525 nm, up to 550 nm, up to 575 nm, up to 600 nm, up to 625 nm, up to 650 nm, up to 675 nm, up to 700 nm). In some embodiments, the method can be part of a P-TPL operation configured to generate a 3D structure with features having pores of about 700 nm.

It is considered that the method can be part of a P-TPL operation configured to generate a 3D structure with features having pores ranging from any of the minimum values described above to any of the maximum values described above. For example, in some embodiments, the method can be part of a P-TPL operation configured to generate a 3D structure with features having pores from 100 nm to 700 nm (e.g., from 125 nm to 675 nm, from 150 nm to 650 nm, from 175 nm to 625 nm, from 200 nm to 600 nm, from 225 nm to 575 nm, from 250 nm to 550 nm, from 275 nm to 525 nm, from 300 nm to 500 nm, from 325 nm to 475 nm, from 350 nm to 450 nm, from 375 nm to 425 nm, from 100 nm to 400 nm, from 125 nm to 375 nm, from 150 nm to 350 nm, from 175 nm to 325 nm, from 200 nm to 300 nm, from 225 nm to 275 nm, from 400 nm to 700 nm, from 425 nm to 675 nm, from 450 nm to 650 nm, from 475 nm to 625 nm, from 500 nm to 600 nm, from 525 nm to 575 nm).

In some embodiments, the method is part of a P-TPL operation configured to generate a 3D structure at rates greater than 0.5 mm$^2$/s per layer (e.g., greater than 0.6 mm$^2$/s per layer, greater than 0.7 mm$^2$/s per layer, greater than 0.8 mm$^2$/s per layer, greater than 0.9 mm$^2$/s per layer, greater than 1 mm$^2$/s per layer, greater than 1.1 mm$^2$/s per layer, greater than 1.2 mm$^2$/s per layer, greater than 1.3 mm$^2$/s per layer, greater than 1.4 mm$^2$/s per layer, greater than 1.5 mm$^2$/s per layer, greater than 1.6 mm$^2$/s per layer, greater than 1.7 mm$^2$/s per layer, greater than 1.8 mm$^2$/s per layer, greater than 1.9 mm$^2$/s per layer, greater than 2 mm$^2$/s per layer). In some embodiments, the method can be part of a P-TPL operation configured to generate a 3D structure at rates up to 2 mm$^2$/s per layer (e.g., up to 1.9 mm$^2$/s per layer, up to 1.8 mm$^2$/s per layer, up to 1.7 mm$^2$/s per layer, up to 1.6 mm$^2$/s per layer, up to 1.5 mm$^2$/s per layer, up to 1.4 mm$^2$/s per layer, up to 1.3 mm$^2$/s per layer, up to 1.2 mm$^2$/s per layer, up to 1.1 mm$^2$/s per layer, up to 1 mm$^2$/s per layer, up to 0.9 mm$^2$/s per layer, up to 0.8 mm$^2$/s per layer, up to 0.7 mm$^2$/s per layer, up to 0.6 mm$^2$/s per layer, up to 0.5 mm$^2$/s per layer). In some embodiments, the method can be part of a P-TPL operation configured to generate a 3D structure at rates of about 0.5 mm$^2$/s per layer.

It is considered that the method can be part of a P-TPL operation configured to generate a 3D structure at rates ranging from any of the minimum values described above to any of the maximum values described above. For example, in some embodiments, the method can be part of a P-TPL operation configured to generate a 3D structure at rates from 0.5 mm$^2$/s per layer to 2 mm$^2$/s per layer (e.g., from 0.6 mm$^2$/s per layer to 1.9 mm$^2$/s per layer, from 0.7 mm$^2$/s per layer to 1.8 mm$^2$/s per layer, from 0.8 mm$^2$/s per layer to 1.7 mm$^2$/s per layer, from 0.9 mm$^2$/s per layer to 1.6 mm$^2$/s per layer, from 1 mm$^2$/s per layer to 1.5 mm$^2$/s per layer, from 1.1 mm$^2$/s per layer to 1.4 mm$^2$/s per layer, from 1.2 mm$^2$/s per layer to 1.3 mm$^2$/s per layer, from 0.5 mm$^2$/s per layer to 1.3 mm$^2$/s per layer, from 0.6 mm$^2$/s per layer to 1.2 mm$^2$/s per layer, from 0.7 mm$^2$/s per layer to 1.1 mm$^2$/s per layer, from 0.8 mm$^2$/s per layer to 1 mm$^2$/s per layer, from 1.2 mm$^2$/s per layer to 2 mm$^2$/s per layer, from 1.3 mm$^2$/s per layer to 1.9 mm$^2$/s per layer, from 1.4 mm$^2$/s per layer to 1.8 mm$^2$/s per layer, from 1.5 mm$^2$/s per layer to 1.7 mm$^2$/s per layer).

In some embodiments, the polymer resist includes at least a photoinitiator, a radical quencher, and a monomer, where the concentration of the photoinitiator can be less than one-third (e.g., less than 0.32 times less than 0.3 times, less than 0.28 times, less than 0.26 times, less than 0.24 times, less than 0.22 times, less than 0.2 times, less than 0.18 times, less than 0.16 times, less than 0.14 times, less than 0.12 times, less than 0.1 times, less than 0.08 times, less than 0.06 times, less than 0.05 times) the concentration of the radical quencher.

In some embodiments, the photoinitiator can include 4,4'-((1E,1'E)-(2-((2-Ethylhexyl)oxy)-5-methoxy-1,4-phenylene)bis(ethene-2,1-diyl))bis(N,N-dibutylaniline), or any other suitable TPL photoinitiator or any combination thereof.

In some embodiments, the radical quencher can include dissolved oxygen, 4-methoxyphenol, or any other suitable radical quencher or any combination thereof.

In some embodiments, the monomer can include acrylates, alkenes, epoxides, or any other suitable monomer or any combination thereof.

In some embodiments, the solubility threshold degree of polymer conversion (DOC) of the resist can be less than 10% (e.g., less than 9.5%, less than 9%, less than 8.5%, less than 8%, less than 7.5%, less than 7%, less than 6.5%, less than 6%, less than 5.5%, less than 5%, less than 4.5%, less than 4%, less than 3.5%, less than 3%, less than 2.5%, less than 2%, less than 1.5%, less than 1%). In some embodiments, the solubility threshold DOC can be up to 1% (e.g., up to 1.5%, up to 2%, up to 2.5%, up to 3%, up to 3.5%, up to 4%, up to 4.5%, up to 5%, up to 5.5%, up to 6%, up to 6.5%, up to 7%, up to 7.5%, up to 8%, up to 8.5%, up to 9%, up to 9.5%, up to 10%). As used herein, the term "solubility threshold DOC" refers to the limit of polymer conversion above which the polymer is insoluble in a given solvent. Photolithography at a low solubility threshold DOC can allow low radical concentrations in the photoresist, which can lead to low consumption of the radical quencher and suppressed proximity effects.

It is considered that the solubility threshold DOC can range from any of the minimum values described above to any of the maximum values described above. For example, in some embodiments, the solubility threshold DOC can be from 1% to 10% (e.g., from 1.5% to 9.5%, from 2% to 9%, from 2.5% to 8.5%, from 3% to 8%, from 3.5% to 7.5%, from 4% to 7%, from 4.5% to 6.5%, from 5% to 6%, from 1% to 5.5%, from 1.5% to 5%, from 2% to 4.5%, from 2.5% to 4%, from 3% to 3.5%, from 5.5% to 10%, from 6% to 9.5%, from 6.5% to 9%, from 7% to 8.5%, from 7.5% to 8%).

In some embodiments, the 3D structure is for at least one of micro-robotic component, micro-fluidic component, scaffold for bioengineered tissue, mechanical metamaterial, photonic component (e.g., for information processing), or a structured electrode (e.g., for energy storage component).

Two-Proton Lithography System Discussion

TPL relies on nonlinear two-photon light absorption that can achieve high light intensities on the order of $\sim$1 TW/cm$^2$ to locally polymerize features that are smaller than the size of the focused light spot (Carlotti and Mattoli, 2019; Jonušauskas, Juodkazis, and Malinauskas, 2018; LaFratta and Baldacchini, 2017; Skliutas et al., 2021; Sun and Kawata, 2004; Wu, Serbin, and Gu, 2006).

Proximity effects have been observed in TPL and refer to the broadening of features that are printed in the physical proximity of other features that were either processed previously or are being processed simultaneously (Arnoux et al., 2022; Oakdale et al., 2017; Waller and Von Freymann, 2016; Zheng et al., 2019). Proximity effects were rarely discussed in early empirical studies of TPL that were based on the sequential point-by-point writing mechanism at low laser scanning speeds of $\sim$1-100 μm/s (Sun and Kawata 2004; Wu, Serbin, and Gu 2006). Contemporary work has demonstrated that proximity effects are negligible at such low speeds but become significant at high scanning speeds of $\sim$10 mm/s and higher (Oakdale et al., 2017). At these high speeds, densely packed features are larger than their sparser counterparts even when printed under the same processing conditions. This behavior has been leveraged to rapidly print solid geometries for microscale optics by merging together the closely spaced features (Aderneuer, Fernández, and Ferrini 2021). Nevertheless, printing of closely spaced fine features with nanoscale porosities is challenging at high scanning speeds (Oakdale et al., 2017). Proximity effects have also been observed in parallelized TPL wherein multiple points are processed at once (Arnoux et al., 2022; Kim and Saha, 2020). In these studies, more polymerization, up to the point of uncontrolled excessive printing, has been observed in densely packed structures. Collectively, these studies highlight that achieving the printing of 3D structures with fine features and fine porosities is challenging under high throughput conditions. Thus, there is a need to investigate and overcome the proximity effects to solve this challenge.

Although proximity effects have been widely observed in TPL, these effects have not been extensively studied, and their physical origins are not well understood. Consequently, it is challenging to overcome the proximity effects during the printing of densely packed 3D structures with porosities finer than 1 μm. For example, it has been hypothesized that proximity effects during sequential TPL arise from the reaction-diffusion kinetics of photopolymerization (Oakdale et al., 2017; Sakellari et al., 2012; Waller and Von Freymann, 2016; Yang et al., 2019). Specifically, the regions in the proximity of previously processed regions of the photoresist have a lower concentration of the chemical species (such as oxygen) that terminate polymerization due to their consumption (Mueller et al., 2014; Yang et al., 2019). At low scanning speeds, diffusion of the species from other regions can replenish the lost amount, but at high scanning speeds, diffusion is too slow to replenish it. Thus, subsequent polymerization is poorly terminated which then leads to broadening of the features. Additionally, it has been hypothesized that during parallel printing, the optical properties of the beam depend on the structure being printed, because of which more polymerization occurs for denser structures (Arnoux et al., 2022; Kim and Saha, 2020). These qualitative explanations help identify those geometries that exhibit significant proximity effects and thereby avoid printing them (Arnoux et al., 2022; Oakdale et al., 2017). However, due to the lack of physics-based quantitative models of the underlying mechanisms, it is challenging to identify how one may modify the processing conditions to overcome the proximity effects and print the desired densely packed 3D structures.

Past demonstrations of P-TPL have been limited to the printing of widely spaced features (Saha et al., 2019; Somers et al., 2021), and the printing of nanoporous 3D structures has not yet been demonstrated. Interestingly, it has been suggested that it may be impossible to print such densely packed structures with P-TPL due to the proximity effects (Hahn et al., 2020; Hahn and Wegener, 2020; Saha and Chen, 2020). Here, the study quantifies the proximity effects in P-TPL and demonstrates that printing of such dense structures is indeed possible via modifications to the sequence of the projected images and the processing conditions.

Experimental Results and Additional Examples

A study was conducted that examined the proximity effects during projection TPL (P-TPL). A high-throughput parallel processing technique (Saha et al. 2019) was previously developed that demonstrated the proximity effects can be overcome to rapidly print densely packed 3D structures with both nanoscale features and porosities.

The instant study employed physics-based computational models of the optical and chemical sources of the proximity effects in P-TPL and demonstrated the use of the model predictions to print densely packed nanoporous 3D structures. When compared with conventional point-scanning TPL, P-TPL significantly increases the rate of printing by processing an entire 2D layer at once. This was achieved by projecting a patterned 2D light sheet comprising more than a million focused spots. A key feature of P-TPL is that the projected light sheet polymerizes only a thin layer of the photopolymer without polymerizing excess material above or below the focal plane (Saha et al. 2019). It can employ spatial and temporal focusing of femtosecond light to generate nonlinear intensity gradients along the depth direction. The focusing technique employed in parallel two-photon microscopy has been used to image thin axial sections in biomaterials (Papagiakoumou, Ronzitti, and Emiliani 2020).

The study demonstrated that the optical proximity effects can be minimized by projecting sparse images, whereas the chemical effects can be minimized by operating under conditions that weakly consume the dissolved oxygen in the photoresist. The study applied the results to develop an interspersing projection technique that overcomes the proximity effects and enables the printing of densely packed 3D structures, as illustrated in FIGS. 1A-1E. The study demonstrated, both computationally and empirically, that interspersing the features by projecting a sequence of sparse images on the same plane leads to the generation of closely spaced fine features. The study demonstrated the printing of 3D structures with distinct features thinner than 300 nm in width and with pores smaller than 700 nm. The study overcame the proximity effects to print dense 3D structures that would otherwise be challenging to print rapidly.

Materials and Methods

Materials: Custom photopolymer resists were synthesized by mixing polyfunctional acrylate monomers, a custom photoinitiator, and a radical inhibitor. The resist included a mixture of: (i) a mixture of pentaerythritol tetra-acrylate, pentaerythritol triacrylate (PETA), and trimethylolpropane triacrylate that was sourced from Sigma Aldrich and had a refractive index of 1.483, (ii)bisphenol A ethoxylate diacrylate with average Mn ~468-EO/phenol 1.5 (BPADA) that was sourced from Sigma Aldrich and had a refractive index of 1.545, (iii) 4,4'-((1E,1'E)-(2-((2-Ethylhexyl)oxy)-5-methoxy-1,4-phenylene)bis(ethene-2,1-diyl))bis(N,N-dibutylaniline) that was procured from a commercial custom chemical synthesis service provider and which was synthesized from precursors as a photoinitiator following known literature procedures (Rumi et al. 2000), and (iv) additional 4-methoxyphenol (MEHQ) as a radical inhibitor. The monomer mixtures (i) and (ii) were mixed in a 35:65 ratio by weight to generate a monomer blend with a refractive index of 1.52 that closely matches the refractive index of the immersion medium of the objective lenses. This index-matched blend was used here to achieve sharp focusing through minimization of spherical aberrations in the dip-in printing mode wherein the lens is directly dipped into the photoresist during printing (Mettry et al. 2021; Saha et al. 2018). The resists contained 0.1% by weight of the photoinitiator and 500 ppm of additional MEHQ.

P-TPL 3D printer: The study built a P-TPL system that is similar in design to the printer used in a past study (Saha et al. 2019) to perform the instant 3D printing. The printer was driven by a Spectra-Physics Solstice Ace ultrafast laser amplifier that generates a linearly polarized beam with a center wavelength of 804 nm, FWHM spectral bandwidth of 41 nm, a pulse width of ~35 fs, and a repetition rate of 5 kHz. The average power of the processing beam was controlled using a series of beam splitters and neutral density filters. The commercially available Lightcrafter 6500 DMD system was used as the digital mask. It has an array of 1920×1080 pixels at a pixel-to-pixel spacing of 7.56 μm. A commercially available tube lens of focal length 200 mm was used as the collimating lens. The beam was focused using a 60×1.25 NA oil immersion objective lens (Olympus RMS60X-PFOD) that had an optical transmission efficiency of 0.73. The Gaussian beam from the laser was transformed to an approximate flattop beam using a commercially available refractive beam shaper (AdlOptica GmbH, piShaper).

3D printing and development: 3D printing was performed by projecting a series of 2D images into the photoresist through an oil-immersion objective lens that was dipped directly into the resist. Printing was performed with a beam that had a time-averaged power of 139 nW/pixel, as measured immediately before the input aperture of the objective lens. Layered 3D printing was performed by moving the substrate away from the lens after printing each layer. Printing was performed on top of bare glass slides coated with a thin layer of indium-tin-oxide (ITO), which were first cleaned by exposing to air plasma for 10 min. After printing, the uncured resist on the substrate was dissolved and washed away in propylene glycol methyl ether acetate (PGMEA) by dipping the substrate into a bath of PGMEA for 10 min. The substrate was then cleaned by dipping it into a clean bath of PGMEA for another 10 min. Without letting the substrate dry, the printed structures were then photochemically cured to improve their mechanical properties (Kim and Saha, 2022; Ladner, Cullinan, and Saha, 2019). This was achieved by transferring the structures into a 5% solution of Irgacure 651 in PGMEA and then exposing them to 365 nm UV light from a hand-held lamp for a period of 30 min. During exposure, the UV lamp with a power of 4 W was placed approximately 1 cm away from the printed structures. This photocuring step improves the mechanical properties of the printed structures and minimizes mechanical failure due to the capillary forces generated during drying. After this step, the substrates were washed by dipping in a clean bath of PGMEA for 5 min, then taken out of the liquid bath and allowed to dry slowly overnight inside a confined container with minimal airflow to reduce the capillary forces.

Optical simulations: The study performed optical simulation based on a model described in Saha et al. 2019. In the simulation, the light field in the focal volume was computed by simulating the propagation of a single broadband femtosecond pulse through the optical system. The propagation steps were mathematically represented using Fourier optics and computationally modeled using the MATLAB software package. The optical system includes a 4f-like arrangement of the collimating and objective lenses wherein the surface of the DMD and the focal plane in the resist are conjugate planes of each other. The DMD was oriented with respect to the incident beam to achieve a blazed grating condition corresponding to the center wavelength of the laser and the DMD micromirror pitch. The instantaneous intensity in the focal volume of the resist was simulated by first separately evaluating the electric field for each wavelength using monochromatic coherent optical models and then summing up the contribution of each wavelength. At each spatial location, the peak intensity was evaluated as the maximum value of this instantaneous intensity. The pulse width was evaluated by summing up all the time steps at which the instantaneous intensity exceeded half of the peak intensity. The optical dosage was evaluated by integrating the square of the instantaneous intensity with respect to time over the full duration of the simulation (i.e., 4 ps).

Simulation of photopolymerization: The study performed a physics-based simulation of photo-polymerization via finite element modeling (FEM) of a set of reaction-diffusion partial differential equations. The equations modeled the kinetics of the radical quenching, polymer chain growth, and polymer chain termination reactions and the diffusion of the terminating species (oxygen) and free radicals generated from the photoinitiator molecules. The study developed the model using a commercially available COMSOL multi-physics simulation package, and it was based on past work (Pingali and Saha, 2022). The FEM model from the literature was modified by updating the light dosage input and by calibrating the model parameters using empirical data from the custom-built P-TPL system. The light dosage input was updated to use the optical dosage per pulse as the input and the product of quantum yield and two-photon cross-section of the photoinitiator was calibrated from empirical data of P-TPL. The threshold degree of polymer conversion was also empirically evaluated from Raman micro-spectroscopy of polymerized photoresist droplets that were polymerized using single-photon UV light illumination. Details of the reaction-diffusion equations and the calibration of the model using empirical data are available in the supplemental materials. The FEM simulations were performed for the same average power/pixel and printer configurations as that in the experimental setup.

General characterization: Scanning electron micrographs were obtained on a Hitachi SU8010 scanning electron microscope (SEM) at 1-15 keV accelerating voltage. The printed samples were coated with a thin layer of gold (<5 nm thick) before SEM imaging. Refractive index (RI) measurements were recorded on uncured photoresist material using a Mettler Toledo Excellence R4 refractometer. RI was measured at the D line of sodium (589 nm) at 20° C. Raman micro-spectroscopy data were measured on a Renishaw in Via Qontor Raman micro-spectroscope. The degree of polymer conversion was evaluated from Raman micro-spectroscopy datasets using literature techniques (Oakdale et al. 2016), as discussed in detail in the supplemental materials.

Model setup: The finite element model implements a set of reaction-diffusion partial differential equations to represent the polymerization processes in P-TPL. The numerical model had been adapted from a previous work [38]. Table 1 provides a summary of the parameters used for the numerical model. The set of partial differential Equations 1-7 represented the mathematical model that was solved using the finite element method:

$$\Delta[R^*] = \frac{D_p \sigma^{(2)} \Phi}{h^2 \nu^2}[PI] \quad \text{(EQ. 1)}$$

$$\frac{d}{dt}[R*] = -k_p[PETA][R*] - k_q[O_2][R*] + D_{R*}\left(\frac{\partial^2[R*]}{\partial x^2} + \frac{\partial^2[R*]}{\partial z^2}\right) \quad \text{(EQ. 2)}$$

$$\frac{d}{dt}[PETA] = -k_p[PETA][R*] - k_p[PETA][P*] \quad \text{(EQ. 3)}$$

$$\frac{d}{dt}[P*] = k_p[PETA][R*] - k_t[O_2][P*] \quad \text{(EQ. 4)}$$

$$\frac{d}{dt}[O_2] = -k_q[O_2][R*] - k_t[O_2][P*] + D_{O_2}\left(\frac{\partial^2[O_2]}{\partial x^2} + \frac{\partial^2[O_2]}{\partial z^2}\right) \quad \text{(EQ. 5)}$$

$$\frac{d}{dt}[R^x] = k_q[O_2][R*] \quad \text{(EQ. 6)}$$

$$\frac{d}{dt}[P^x] = k_t[O_2][P*] \quad \text{(EQ. 7)}$$

In the above equations, the square brackets represent the concentration of the chemical species within the bracket, whereas the $\Delta$ symbol represents the change in the parameter. PI represents the photoinitiator, $R^*$ represents the primary radicals formed from the photoinitiator molecule, PETA represents the unreacted monomer, $O_2$ represents oxygen molecule, $P^*$ represents the secondary radicals formed through reactions with the monomer molecules, $R^x$ represents the dead primary radicals that cannot participate in further reactions, and $P^x$ represents the dead secondary radicals that cannot participate in further reactions.

TABLE 1

Model parameters and inputs to the model.

| Symbol | Parameter Name | Value | Source |
| --- | --- | --- | --- |
| $\sigma^{(2)}$ | Two-photon cross section | $133 \times 10^{-50}$ cm$^4$s/photon-molecule | Estimate from Rumi et al. (FIG. 5, compound 8) (Rumi et al, 2000) |
| h | Planck's constant | $6.626 \times 10^{-34}$ m$^2$ kg/s | Fundamental constant |
| $k_p$ | Polymerization rate constant | $4.3 \times 10^4$ dm$^3$ mol$^{-1}$s$^{-1}$ | Mueller et al., 2013 |
| $k_q$ | R* quenching rate constant | $2.3 \times 10^6$ dm$^3$ mol$^{-1}$s$^{-1}$ | |
| $k_t$ | Termination rate constant | $5.9 \times 10^4$ dm$^3$ mol$^{-1}$s$^{-1}$ | Calibrated against empirical data |
| $\Phi$ | Quantum yield of photoinitiator | $6.1 \times 10^{-3}$ | |
| $DOC_{th}$ | Degree of conversion threshold | 0.068 | Determined through micro-Raman spectroscopy |
| $D_{O2}$ | Diffusivity of oxygen | $1.2 \times 10^{-12}$ m$^2$ s$^{-1}$ | Estimated with Stokes-Einstein equation |
| $D_R*$ | Diffusivity of R* | $10^{-13}$ m$^2$ s$^{-1}$ | |
| $\nu$ | Optical frequency (central) | 375 THz | Properties of laser in the printer |
| | Pulse repetition rate | 5 kHz | |
| $[O_2]_0$ | Initial O$_2$ concentration (realistic level) | $6 \times 10^{-3}$ mol dm$^{-3}$ | Mueller et al., 2013 |
| | Initial O$_2$ concentration (hypothetical low level) | $3 \times 10^{-4}$ mol dm$^{-3}$ | 5% of realistic level |
| $[PI]_0$ | Initial photoinitiator concentration | $1.65 \times 10^{-3}$ mol dm$^{-3}$ | Resist composition, PI at 0.1% by weight |
| $[PETA]_0$ | Initial monomer concentration | 4.0 mol dm$^{-3}$ | Material datasheet for PETA |

Optical dosage input to the model: While the prior version of the model used a time-averaged intensity of the projected light field and the pulse duration at the focal plane as the optical dosage input to the finite element model (38), the current version of the model employed in the study used the optical dosage per pulse ($D_p$) as the input to the model. The modification was observed to accurately capture the effect of the spatiotemporally varying instantaneous intensity and avoid the error from space and time averaging. The study also implemented a modified control scheme to decrease the amount of photoinitiator remaining after each pulse. The product of the two-photon cross-section and the quantum yield of the photoinitiator molecule was empirically calibrated. The two-photon cross-section was estimated from the literature for the illumination center wavelength of 804 nm (33). The quantum yield can then be estimated from the calibrated product of two-photon cross-section and quantum yield. These values are listed in Table 1.

Empirical determination of the threshold degree of polymer conversion ($DOC_{th}$): The study empirically determined the $DOC_{th}$ as the DOC value at which the photopolymerized resist transitions from being soluble to becoming insoluble in the solvent that is used during the P-TPL development process. For these experiments, single-digit mm-scale droplets of the photoresist were exposed to varying durations of UV light at a fixed intensity. Irgacure 651 was used as the photoinitiator in the resist. After exposure, the droplets were submerged in the solvent propylene glycol monomethyl ether acetate (PGMEA) for 10 minutes and then washed in a bath of isopropanol for 10 minutes. The droplets were then visually observed to identify whether any solidified material remained (outcome '1') or whether the entire droplet dissolved ('outcome 0'). The results of these studies are shown in FIG. 5E.

Figures 5A, 5B, 5C, 5D:
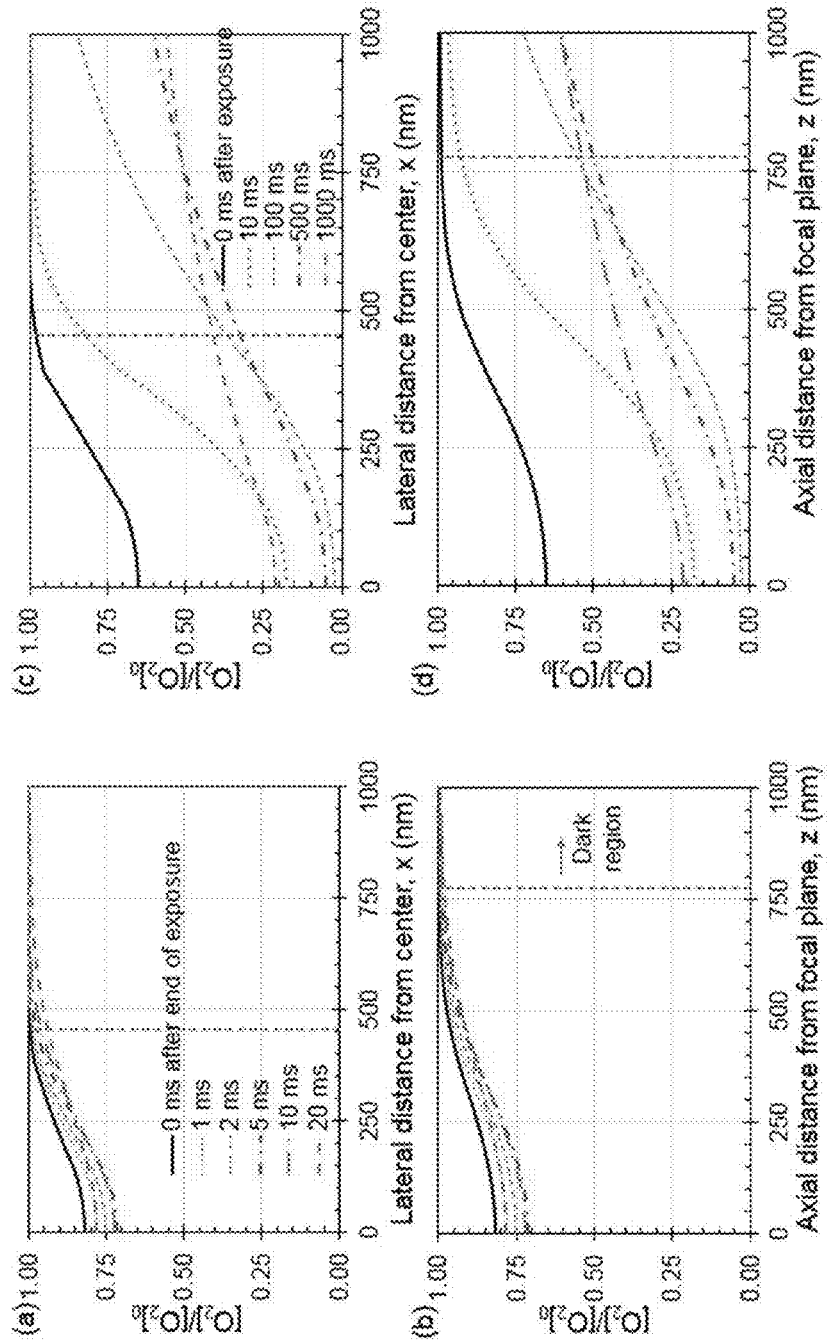
FIG. 5E depicts presence or absence of printing under flood UV exposure for different durations of exposure.
FIG. 5F depicts micro-Raman spectrographs for droplet of monomer blend ('Unexposed sample') and polymerized droplet exposed to 10 minutes of flood UV exposure ('10 min exposed sample').
Figure 5E:
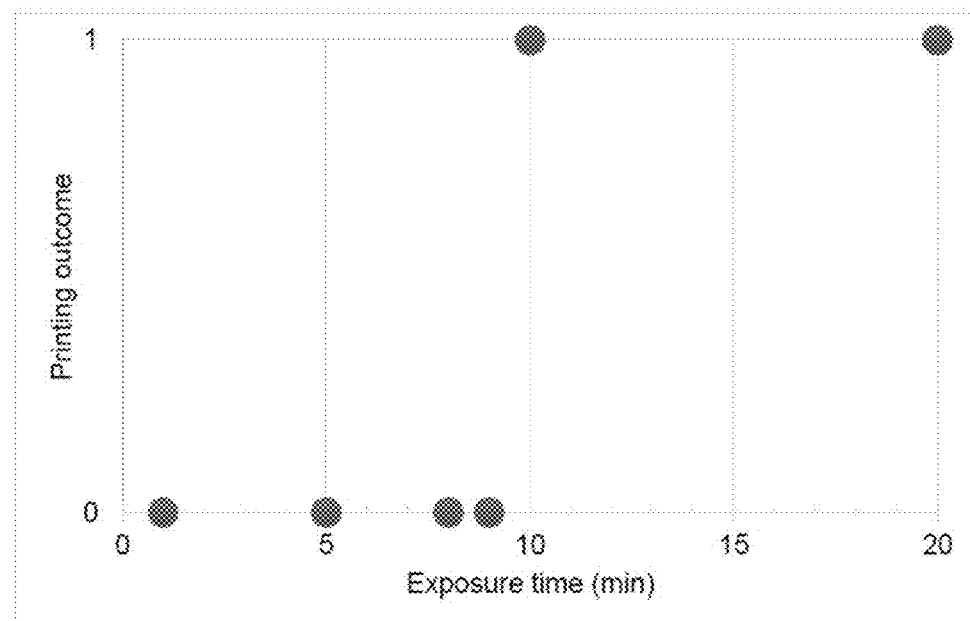
Figure 5F:
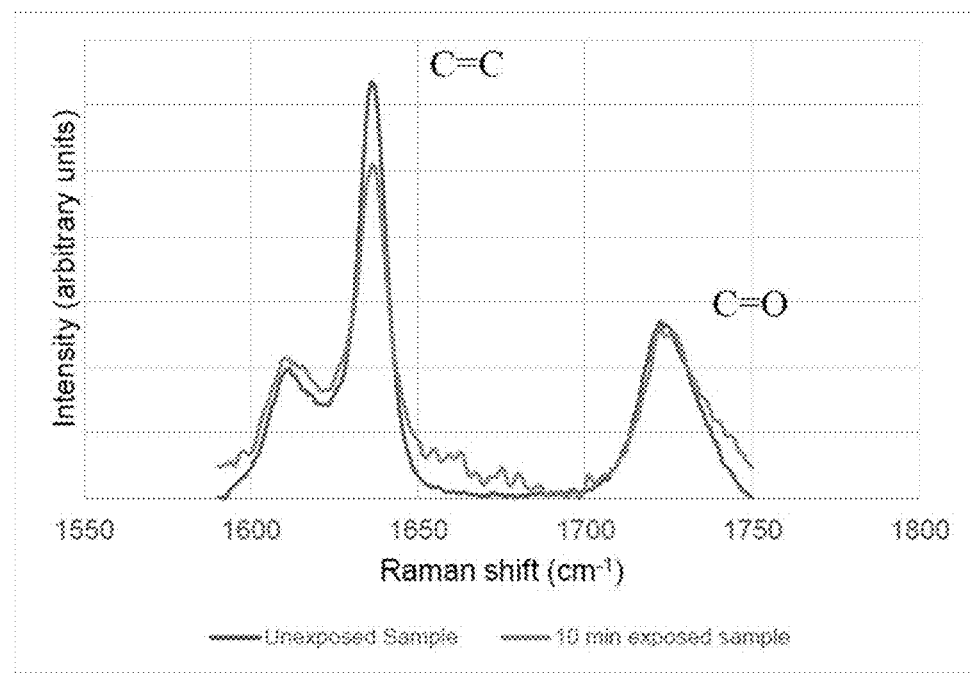

From FIG. 5E, it can be seen that a UV exposure of 10 minutes is necessary to cross the threshold DOC. The DOC of the 10-minute sample was measured through micro-Raman spectroscopy, which is a widely used technique for determining the DOC in samples fabricated by two-photon polymerization (39, 45). Measurements were taken at several depths within the polymerized droplet, and the DOC was averaged over the depth. This yielded a $DOC_{th}$ value of 6.8% for the monomer blend used in this study. A representative spectrograph that was obtained from the micro-Raman measurements is shown in FIG. 5F. The DOC was calculated from the ratio between the areas of the C=C and C=O peaks in the unpolymerized and polymerized samples. As the number of C=O peaks does not change during polymerization, the intensity of the C=O peaks was used to scale the two spectrographs. Upon rescaling, the change in the intensity of C=C peaks represents the change in the number of C=C bonds, i.e., the degree of polymerization. This is mathematically represented per Equation 8.

$$DOC = 1 - \left( \frac{A_{C=C}/A_{C=O}}{A'_{C=C}/A'_{C=O}} \right) \quad \text{(EQ. 8)}$$

In Equation 8, the Ax parameters represent the area under the peak for the x bond, the parameters in the numerator of the second term on the right-hand side represent the parameters for the cured sample, and the parameters in the denominator represent the parameters for the uncured sample.

Estimation of decay time constant during decay of [P*]: The decay in the concentration of the secondary radicals (i.e., P*) occurs via termination of these radicals with oxygen, as represented by the second term on the right-hand side of EQ. 4. Upon simplification, the rate of decay of P* can be represented per Equation 9.

$$\frac{d}{dt}[P*] = -k_t[O_2][P*] \quad \text{(EQ. 9)}$$

For the case when the concentration of oxygen does not precipitously fall, one may consider [$O_2$] as a constant with respect to time. Under this approximation, Equation S9 reduces to an exponential decay equation with the decay time constant $\tau=1/(kt\,[O_2])$. The decay constant represents the time at which [P*] reduces to 1/e times its peak value (i.e., the value at time $\tau=0$). Upon substituting the values for oxygen concentration=$6\times10^{-3}$ mol $dm^{-3}$ and kt=$5.9\times10^4$ $dm^3$ $mol^{-1}$ $s^{-1}$, the decay time constant $\tau=3$ ms. This estimate is close to the value of t (=4 ms) as measured from FIG. 6A.

Experimental Results and Discussion

Optical proximity effect from light projection: To quantify the optical source of the proximity effects, the study modeled the effect of feature density on the light dosage distribution in the focal volume. The model captures the physics of electromagnetic wave propagation through the P-TPL optical system for the specific case of propagation of a single pulse of femtosecond light. The model was developed using Fourier optics techniques, and it was based on the model presented in previous work on P-TPL (Saha et al. 2019). Here, the study extended previous work by evaluating the pulse width ($\tau$), the peak intensity ($I_p$), and the optical dosage per pulse ($D_p$) in the focal volume when the projections were varied. The optical dosage per pulse refers to the time integral of the square of the instantaneous intensity over the duration of the pulse. Therefore, it quantified the net optical input to the photopolymerization process from each pulse.

FIG. 3C illustrates that upon a projection of a patterned image, the optical dosage varied nonlinearly with the axial distance from the focal plane. For the projection of a sparse image, the dosage decreased rapidly with increasing axial distance, and it dropped to less than 1% of the peak dosage within a distance of 1 µm from the focal plane. This stronger-than-linear axial gradient of dosage arose in P-TPL because both the temporal shape and the length of the femtosecond pulse varied along the axial direction. The pulse temporally resembled a Gaussian shape at the focal plane, and it was also the shortest at that plane. However, the pulse broadened, and its shape deviated away from the Gaussian shape as the axial distance from the focal plane increased. The pulse shape at the focal plane and away from it is illustrated in FIG. 3E. It can be observed that the pulse resembles a Gaussian temporal shape at the focal plane for both structured (i.e., patterned) and unstructured (i.e., fully-illuminated) projections. However, the temporal shape of the pulse deviates from the Gaussian shape at planes away from the focal plane. Furthermore, the intensity of the pulse intermittently drops to zero during the projection of patterned light sheets. Therefore, a Gaussian pulse shape approximation is not accurate during the projection of patterned light sheets. One would underestimate the axial gradient of the dosage if the variation in the shape of the pulse was not accounted for, as was performed previously while reviewing P-TPL (Hahn et al. 2020).

The variation in the temporal pulse shape with axial distance can be explained through the temporal focusing mechanism of P-TPL, particularly when this focusing is applied to a structured light beam. It is well-known that during temporal focusing, the various wavelengths of light, that exist within the femtosecond pulse, arrive at the focal plane after traversing different optical paths (Choi et al. 2013; Oron, Tal, and Silberberg 2005; Zhu et al. 2005). The optical path lengths for all wavelengths are equal only at the focal plane, but the path lengths differ at planes away from the focal plane (Choi et al. 2013; Oron, Tal, and Silberberg 2005; Zhu et al. 2005). For a fully illuminated image on the DMD, the different wavelengths arrive at a given spatial position within the focal volume continually, one after the other. Temporal focusing of such a fully illuminated beam stretches the pulse at axial locations away from the focus but causes only minimal deviations from the Gaussian shape. In contrast, it was observed here that upon a projection of a structured image on the DMD, the different wavelengths from the different sections of the DMD arrived at a spatial location with temporal gaps, thereby causing a change in the temporal shape of the pulse while simultaneously stretching it. These temporal gaps split an otherwise strong pulse into multiple weak pulses and this generated strongly nonlinear axial dosage gradients in P-TPL.

The dependence of the optical dosage distribution on the structure of the projected image suggests that this optical behavior could be a source of the proximity effects observed during printing. The study verified that this optical behavior is indeed a source of proximity effects by further investigating the effect of the density of features in the projected image on the dosage distribution in the axial and lateral directions. The study specifically studied this effect during the projection of sets of periodic lines of a fixed width but with varying periods. The overall size of the image was held constant by changing the number of lines in the image. FIG. 3F shows that the background optical dosage along the axial direction depended strongly on the proximity of the line features, with a non-negligible finite background dosage existing at all planes for a fully illuminated image. Non-negligible finite background dosages also existed intermittently at some planes away from the focal plane for dense periodic line patterns. However, this background dosage became negligible for the sparse image. In contrast, the background dosage in the lateral direction was insensitive to the proximity of the lines because the dosage became identically zero at the non-illuminated points on the focal plane (FIG. 3G). These observations could also be visually verified from the dosage distribution shown in FIG. 3C. The presence of high axial background dosage during the projection of dense images made the printing more susceptible to over-polymerization defects because the background dosage may itself lead to some polymerization. Thus, optical contribution to the proximity effects in P-TPL made it challenging to achieve the printing of 3D structures with fine features and fine porosities.

The study overcame the challenge of printing fine features with fine porosities by leveraging (i) the absence of background dosage on the focal plane and (ii) the dependence of the axial background dosage on the feature density. If a dense image is split into two or more non-overlapping sparse images and these images are then projected sequentially, the optical dosage on the focal plane resulting from one image will not add up with the optical dosage resulting from the other images. This is because the background dosage along the lateral direction, i.e., on the focal plane, is zero in the non-illuminated regions. Therefore, when considering exposures on the focal plane, the sequential projection scheme of P-TPL is similar to the serial point-by-point scanning scheme of conventional TPL. In both cases, the optical dosage is generated only in those regions which are directly exposed to light. However, the background dosage in planes away from the focal plane cannot be fully eliminated by splitting a dense image into sparse images. Nevertheless, the background dosage from each sparse projection will be lower than that from a single dense projection, as demonstrated in FIGS. 3F-3G. Thus, splitting the image into multiple sparse images broadened the operating window and made it more straightforward to achieve the printing of nanoporous 3D structures.

Chemical proximity effect from polymerization kinetics: Although splitting a dense image into sparser images reduced the background optical dosage, the proximity effects arising from the chemical kinetics of polymerization may be sufficiently high to prevent printing of fine features with fine porosities. Therefore, to isolate the chemical sources of the proximity effects during P-TPL, the study computationally modeled the spatiotemporal evolution of polymerization through a set of coupled reaction-diffusion differential equations. The equations model the rate of the chemical reactions and the rate of diffusion of the chemical species.

It is generally considered that the chemical proximity effects during serial TPL-based printing of acrylate photopolymers arise from the reaction kinetics of the dissolved oxygen in the photoresist (Mueller et al. 2014; Oakdale et al. 2017). Oxygen plays a critical role in printing by quenching the photogenerated radicals and terminating the growth of the polymer chains. The oxygen in the illuminated region is depleted due to its reactions with radicals. This caused oxygen from the immediate vicinity to diffuse into the illuminated region, thereby leading to a depletion of the oxygen in the immediate vicinity. At high scanning speeds, there can be insufficient time for oxygen to diffuse in from a wider region and replenish the oxygen in and around the illuminated region. Thus, subsequent printing in the proximity of the previously printed region was poorly terminated, which led to a higher degree of polymer conversion (DOC) at the periphery of the features. This led to features that were broader than those printed far away from other features. In contrast, at slow scanning speeds, oxygen is sufficiently replenished so that subsequent printing does not lead to broadening of features. It is worth mentioning here that the proximity effects may also arise from the diffusion of other chemical species that diffuse slower than $O_2$, such as the photoinitiator. However, the effect of such slowly-diffusing species has been observed to be negligible at the short ms time scales (Yang et al. 2019), i.e., on the time scales at which P-TPL operates. Therefore, here, the study leveraged the reaction-diffusion kinetics of oxygen to control and minimize the chemical proximity effects in P-TPL.

The study minimized the chemical proximity effects in P-TPL by printing under process conditions that led to low consumption of the dissolved oxygen so that the concentration of oxygen did not fall precipitously during the quenching and termination reactions. The study achieved these beneficial conditions by taking advantage of two distinct process modifications. First, the process was operated in a regime wherein the concentration of the primary radicals (species R*) generated from the photoinitiator molecules was significantly lower than the concentration of the dissolved oxygen ($O_2$) so that the consumption of $O_2$ was minimized. Second, the process was operated under conditions wherein the threshold degree of polymer conversion (i.e., $DOC_{th}$) that must be achieved to ensure successful prints was low.

Figures 4A, 4B, 4C, 4D:
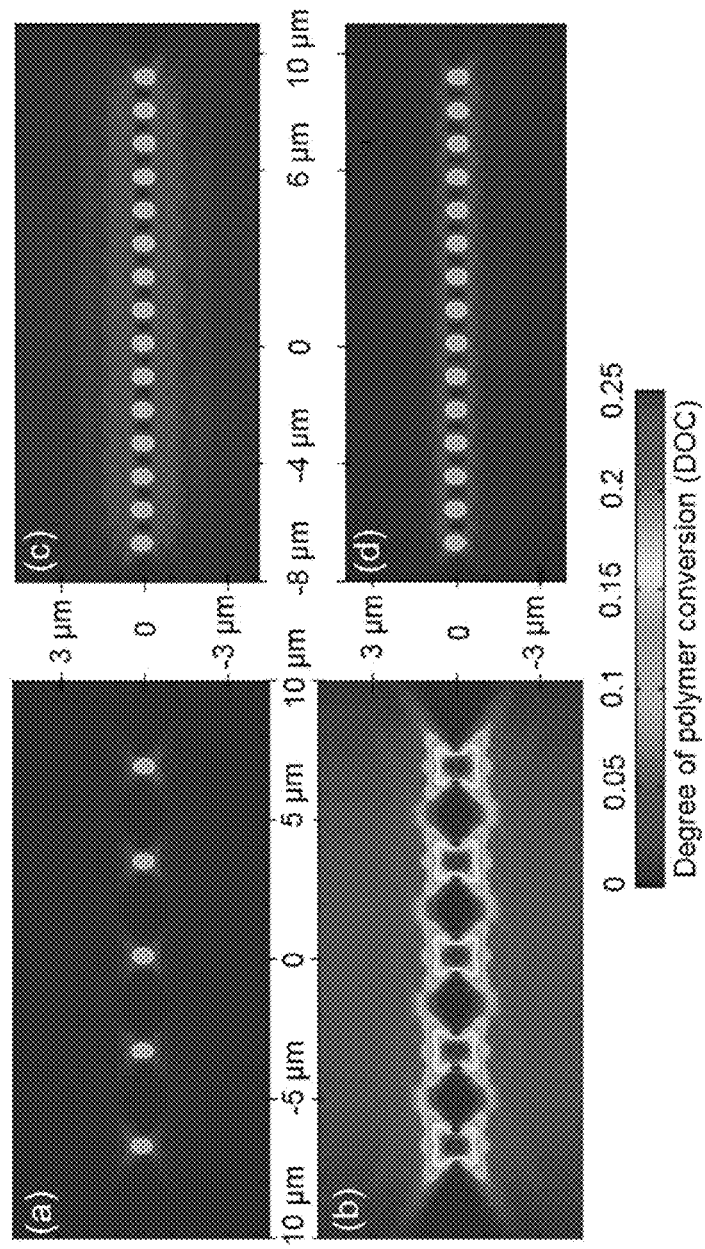

The effect of these process modifications on the printing outcome was studied using FEM simulations. The results of these studies are summarized in FIGS. 4A-4D. One can observe that the DOC achieved at the center of the features and in the vicinity was significantly higher for a hypothetical photoresist that had 20 times lower $O_2$ concentration than a photoresist with realistic concentration of dissolved $O_2$, even when the projected image remained unchanged (FIG. 4A vs FIG. 4B). The numerical value for the realistic concentration of dissolved $O_2$ was obtained from literature values of solubility of $O_2$ in the photoresist (Mueller et al. 2014). These studies demonstrated that it would be challenging to print porous 3D structures with a resist that has a low concentration of dissolved $O_2$. In contrast, when $O_2$ was held constant at a high value and the density of the features in the projected image was varied, comparable values of DOC were achieved at the center of the features, but higher DOC was achieved with a denser image on planes away from the focal plane (FIG. 4A vs FIG. 4C). This distribution of DOC correlates with the optical dosage distribution shown in FIGS. 3A-3D and FIGS. 3F-3G. Thus, it can be deduced that at high $O_2$ concentrations, the chemical source of the proximity effect was suppressed in P-TPL, and the printing outcome reflected the optical proximity effects. The optical proximity effects can be further suppressed by interspersing the line patterns, as evidenced by the reduction of the DOC at planes away from the focal plane in FIG. 4D vs FIG. 4C. This demonstrates the potential of interspersing P-TPL to achieve fine porosities.

It is noteworthy that whether the concentration of $O_2$ is 'high' or 'low' was determined by the relative concentration of the primary radicals $R^*$. Here, the study achieved a high $O_2$ concentration by printing with a low photoinitiator (PI) molar concentration ($=1.65 \times 10^{-3}$ mol $dm^{-3}$), which was less than one-third the molar concentration of the dissolved $O_2$ in the photoresist. This stoichiometry of the photoresist components ensured that under no light exposure conditions could the local oxygen be depleted to zero. The concentration of PI used here was at least an order of magnitude lower than that generally used in conventional point-scanning TPL (Mueller et al. 2014; Sakellari et al. 2012). In addition, printing occurred with a significantly lower number of fs pulses in P-TPL than in conventional serial TPL. For example, P-TPL can print features with 5-10 pulses, whereas serial TPL scanning at a speed of 10 mm/s requires ~1000 pulses (Saha et al. 2017; Saha et al. 2019). The lower number of pulses in P-TPL translated to lower initial concentrations of primary radicals, and consequently, this effect led to lower oxygen consumption during printing. Under this condition, the diffusion of oxygen was suppressed due to lower concentration gradients. The net result was that the chemical proximity effect due to oxygen diffusion was suppressed.

The study further verified the technical claim of suppressed chemical proximity effects by explicitly tracking the spatiotemporal evolution of the concentration of $O_2$ in the illuminated region and in the non-illuminated (i.e., dark) region in the immediate vicinity of the illuminated region. The dark region refers to the region in which the optical dosage per pulse falls below 1% of its peak value, i.e., the value at the center of the line features. It can be observed from FIGS. 5A-5B that for the case of high initial $O_2$ concentration (i.e., $[O_2]_o$), the concentration of $O_2$ in the non-illuminated regions remained within 94% of its initial value, and the concentration remained unchanged beyond a lateral and axial distance of 1 µm. Consequently, the spatiotemporal variations in the concentration of $O_2$ were negligibly small to generate any appreciable diffusion-based effects outside the illuminated region. In contrast, with a hypothetical photoresist that had a lower initial concentration of $O_2$, a significant drop in the concentration of $O_2$ was observed in the non-illuminated regions (FIGS. 5C-5D). Interestingly, this drop was accompanied by rich dynamics of the local $O_2$ concentration evolution; for example, the $O_2$ concentration dropped initially and then started recovering at a later time. Such behavior indicates that subsequent printing in the non-illuminated region was affected by prior printing through the chemical proximity effects. Thus, tuning the processing conditions to suppress the consumption of $O_2$ provided an effective means to suppress the chemical proximity effects.

The study was able to achieve printing in P-TPL even at low concentrations of the primary radicals because the threshold DOC required to achieve printing was fairly low. It is well known that the threshold DOC is determined by two factors: (i) the DOC limit above which the polymer becomes insoluble in a solvent and (ii) the DOC limit above which the polymer becomes strong enough to survive the capillary forces that are generated during the solvent removal process (Fourkas 2020). The second limit is higher than the first limit because the mechanical properties of the processed photoresist increase with increasing DOC (Jiang et al. 2014; Oakdale et al. 2016). Often, TPL printing processes are set up such that successful prints can be achieved only when the DOC exceeds the second limit (Oakdale et al. 2016; Sun et al. 2022). However, the study explicitly devised the P-TPL printing and development processing steps so that successful prints could be achieved even at DOC values lower than the second limit. The study achieved this by introducing an additional photochemical curing step during the development process. This curing process increased the DOC beyond that achieved from fs illumination alone, but it did not broaden the features. The post-print curing process is described in detail elsewhere (Kim and Saha 2022; Ladner, Cullinan, and Saha 2019). This curing step ensured that one only needs to cross the DOC solubility limit to achieve printing. The study empirically measured the DOC solubility limit to be 7% for the photoresist, as shown in FIGS. 5E-5F. The model was calibrated against empirical data generated from the printing of 7-pixel wide lines printed with 3 and 4 pulses of light exposure. The corresponding line widths were measured to be 207 nm and 414 nm. The calibrated kt value is listed in TABLE 1. This DOC threshold is significantly lower than the values available in TPL literature, which range from 16% to 60% (Mueller et al. 2014; Sun et al. 2022). It is noteworthy that the computationally evaluated as-printed DOC did not exceed 16% for the resist composition used here (FIG. 4A), but it did exceed 16% for the hypothetical resist, which has a lower concentration of $O_2$ (FIG. 4B). Thus, without the photochemical curing step, printing via P-TPL would not have been possible under the current set of processing conditions. With this additional curing step, printing in P-TPL could be achieved at low radical concentrations, which led to low oxygen consumption and suppressed chemical proximity effects.

Although the FEM simulations were performed only for a limited set of conditions here, the results can be broadly generalized by developing an intuitive understanding of the underlying chemical dosage effects. Such an understanding can be developed by leveraging the unique time scale of P-TPL. In P-TPL, illumination occurs only for short ~100 fs durations followed by long durations of darkness on the scale of hundreds of us. However, the dark period between subsequent fs pulses in conventional point-scanning TPL lasts only for ~10 ns (Fourkas 2020). It is, therefore, customary to consider that photoactivated radicals are continually generated in serial TPL. This consideration makes it challenging to decouple the dynamics of chemical dosage accumulation from chemical dosage decay. In contrast, the photoactivated radical generation and radical consumption steps in P-TPL can be distinguished in a time sequence and the dynamics of these processes can be better understood. For example, during P-TPL, the dynamics of chemical dosage can be tracked in terms of the rate of change of the concentration of the secondary radicals (P*), i.e., the radicals that are generated through cleavage of C=C bonds in the monomer molecules of the photoresist. The concentration of P* can increase only after new photoactivated primary radicals (i.e., R*) are generated through illumination, whereas its concentration can decrease only through termination, primarily via reacting with dissolved oxygen. The concentration of P* remains unchanged during the cross-linking reactions that cause an increase in the DOC, as these reactions regenerate the radicals. Thus, chemical dosage accumulation from multiple pulses can be quantitatively tracked in terms of the increase in the concentration of P*, whereas dosage decay can be tracked in terms of the decrease in concentration of P*. Additionally, the longer a finite value of P* exists at any material point, the higher the final DOC at that point would be. In combination, these three insights can be applied to rationally select processing conditions to minimize the chemical proximity effects.

For example, FIGS. 6A-6B shows that the chemical dosage accumulated linearly with time and the peak dosage was proportional to the number of optical pulses. The increase in dosage due to each pulse was determined by the amount of light absorbed by the PI, its concentration, and the concentration of $O_2$. In contrast, dosage decayed exponentially with time, and the decay time constant was determined by the concentration of $O_2$. For the photoresist used in these experiments, this time constant was ~3 ms at the center of the illuminated focal spot (FIG. 6A), but the time constant increased to >100 ms for the hypothetical resist with a lower concentration of $O_2$ (FIG. 6B). Details on the quantitative estimates of the time constant are available in the supplemental material. The final DOC was higher when either the time constant was higher or the maximum chemical dosage was higher. Reducing the concentration of primary radicals (i.e., R*) reduced both these parameters and led to a reduction in the final DOC at any material point. With reduced DOC, the chemical proximity effects were minimized because the DOC in the regions away from the central point does not exceed the threshold DOC. This approach of interspersing the line features took advantage of this specific behavior to minimize the chemical proximity effects.

Printing of densely packed porous structures: The study empirically demonstrated the ability to print dense 3D structures via P-TPL by printing various wood-pile structures with pores and features smaller than 1 μm. The woodpiles were printed with a total of 40 layers each, and the layers were spaced along the vertical z-axis by 900 nm. The layers were printed with a time-averaged power of 139 nW/px. The dosage per pulse corresponding to this average beam power is shown in FIG. 3F. Fine porosities were achieved by projecting a sequence of sparse images in each layer to minimize the optical proximity effects and by printing under those process conditions that minimize the chemical proximity effects. Specifically, the woodpiles were printed by projecting sequences of sparse periodic line pattern images, including 5-pixel wide lines at a period of 30 pixels. As each pixel in the digital image mapped to 113 nm in the physical projection, this period corresponded to a physical period of 3.4 μm. Periods finer than this value were achieved by interspersing the lines in one sparse image with the lines in another sparse image such that the resulting printed pattern had a lower period. Each layer was printed by projecting two and three sets of interspersed periodic line patterns to achieve 3D structures with nominal periods of 1.7 and 1.1 μm. Porous structures printed with three sets of interspersed lines are shown in FIGS. 7A-7F and additional structures are shown in FIG. 7G. As shown in FIG. 7B, the projection of a pattern with 5-pixel wide lines and a 10-pixel period generated a fully solid over-polymerized 3D structure that had no distinct line features. In contrast, projecting an image with a period of 30 pixels generated a porous 3D structure with distinct line features but pores bigger than 1 μm. This empirically verifies the presence of proximity effects in P-TPL. Interestingly, a nanoporous 3D structure with distinct line features could be obtained by projecting three images with 30-pixel periods and by interspersing the lines on the same plane. The nominal period of the composite interspersed image was 10 pixels, and it was identical to that of the image projected to create the fully dense structure shown in FIG. 7B. The nominal period is the period in each sparse image divided by the number of interspersed sparse images (i.e., 30 pixels/3 images=10 pixels). It was verified that 3D structures with porosities smaller than 1 μm can be generated in both axial and lateral directions by interspersing P-TPL. Only the topmost layer was kept sparse in these prints to aid in SEM-based visualization of the porosities, but all underlying layers were interspersed (as shown in FIGS. 7E-7F). The study achieved lateral porosities of less than 700 nm and features finer than 300 nm. These structures were significantly more closely packed, yet with distinctly separated features, than what had been printed in the past with P-TPL or what has been printed with projection techniques (Saha et al. 2019; Somers et al. 2021). Although these experiments were limited to 3D lattice structures, the results of this study can be applied to print other densely packed structures by interspersing the features across multiple projections and by minimizing the consumption of dissolved oxygen in the photoresist.

The study included additional experiments to verify the FEA prediction that a photoresist with a lower concentration of dissolved oxygen would lead to higher chemical proximity effects. Photoresists with lower concentrations of dissolved $O_2$ were created by degassing droplets of the photoresist for 30 and 60 min under a vacuum of 0.01 mbar. The degassing was performed immediately before printing with the resists. The degassing process reduced the concentration of the dissolved $O_2$ without affecting the concentration of the photoinitiator. Therefore, this set of experiments provided an unambiguous means to study the chemical proximity effects under varying $O_2$ concentrations. As measuring the concentration of dissolved $O_2$ in non-aqueous solutions is notoriously difficult (Bakar, Abu-Siada, and Islam 2014), here the study did not measure the $O_2$ concentration quantitatively. Instead, the study relied on qualitative trends in the proximity effects arising from the decrease in the concentration of the dissolved $O_2$ with increasing duration of degassing. The 3D structures generated with the degassed resists are shown in FIGS. 8A-8D. The results demonstrate that the proximity effects increased with a decrease in the concentration of the dissolved $O_2$. Under low $O_2$ concentrations, the proximity effects were severe enough to cause adjacent features to merge together. Thus, these experiments validate the FEA model predictions that the chemical proximity effects are more severe in a photoresist that has a lower concentration of dissolved $O_2$. It is noteworthy here that this approach of minimizing the chemical proximity effects by minimizing the consumption of dissolved $O_2$ was limited to acrylate-based photoresists wherein the polymerization reactions are terminated by the dissolved $O_2$. Nevertheless, this approach can be applied to a vast set of acrylate photoresists by tuning the monomer components to process a variety of polymers and polymer-derived metals and ceramics (Bauer, Crook, and Baldacchini, 2023; Mettry et al., 2021; Vyatskikh et al., 2018; Vyatskikh et al., 2020).

Although interspersing leads to a moderate reduction in the rate of printing by a factor of 2-3 times, the rate of interspersing P-TPL was still significantly higher than that of conventional point-scanning TPL. For example, each interspersed layer of size 800×515 pixels was printed here in 9.6 ms (=3.2 ms×3, with no time gap between the projection of the different images). This translates to a processing rate of 0.55 $mm^2$/s per layer. The time to scan the same area sequentially at a high speed of 10-50 mm/s (Oakdale et al., 2017) and a period of 1 μm along one direction was 526 ms-105 ms, which corresponds to a sequential processing rate of 0.01-0.05 $mm^2$/s per layer. Thus, interspersing P-TPL is more than 10-50 times faster than conventional point-scanning TPL. As such, the interspersing technique is effective in rapidly producing nanoporous 3D structures by leveraging the conditions that minimize the proximity effects in P-TPL.

Although a similar interspersing technique has been demonstrated in the past to control the proximity effects in multi-point scanning-based TPL (Arnoux et al. 2022), this work demonstrates that the relative contributions of optical and chemical sources of proximity effects are significantly different in the projection-based versus scanning-based TPL. Here, the study has demonstrated that the chemical proximity effects during P-TPL are suppressed due to the minimal consumption of dissolved $O_2$ in the photoresist under the low-pulse regime of P-TPL. Instead, the overall proximity effects in P-TPL are caused predominantly by the optical proximity effects arising from the light projection scheme. In contrast, past work by Arnoux et al. has demonstrated that diffusive chemical effects contribute significantly to the overall proximity effects in scanning-based TPL (Arnoux et al. 2022). In addition, their approach of minimizing the optical sources of the proximity effects by increasing the spacing between the adjacent multiple light spots does not have a direct analogy in P-TPL. This is because the spacing of adjacent pixels in P-TPL is fixed (at 113 nm here), and it is therefore not possible to avoid overlapping the light from adjacent pixels. The work presented here demonstrates how the optical proximity effects can be minimized even in the presence of this additional constraint. Thus, this work clarifies those aspects of controlling the proximity effects in TPL that have not been discussed before.

While this demonstration of the interspersing technique was performed for those geometries in which the proximity effects arising from enhanced light absorption by previously polymerized material is minimized, however, this interspersing technique can be applied even for those cases in which the proximity effects due to enhanced light absorption by previously polymerized material are present. Here, the study has specifically limited the interspersed printing operations to those geometries in which light from a focal spot did not illuminate any other already polymerized feature on the same layer. This was achieved by selecting the pattern period (1130 nm) to be higher than half of the sum of the width of the focal spot, i.e., the width above which the optical dosage per pulse drops below 0.1% of the peak dosage (1130 nm) and the width of the polymerized feature (300 nm). For features spaced closer than this limit (i.e., closer than 715 nm), the enhanced light absorption from the already polymerized material must also be considered to accurately predict the proximity effects. Nevertheless, these experiments show that the interspersed technique is capable of fabricating dense nanoporous 3D structures even without accounting for the proximity effects arising from enhanced light absorption by previously polymerized material.

Here, the study demonstrated that although it is challenging to print densely packed 3D structures with P-TPL due to the proximity effects, these effects can be overcome through process modifications to achieve the desired printing. The study demonstrates through physics-based computational models that the proximity effects can be distinctly separated into optical and chemical sources. The optical proximity effect can be overcome by minimizing the density of features in the projected image, whereas the chemical proximity effect can be minimized by operating under process conditions that minimize the consumption of oxygen in the photoresist. The study has also presented and validated a generalizable framework to quantitatively understand the chemical proximity effects in TPL via the dynamics of accumulation and decay of chemical dosage. This framework predicts that the chemical proximity effects can be minimized by processing with a lower concentration of photoinitiator, fewer optical pulses, and a photoresist that has a low threshold degree of polymer conversion. The study has leveraged these insights to devise a projection technique to print dense 3D structures by projecting an interspersing sequence of sparse images on the same plane. This interspersing P-TPL technique enables the printing of 3D woodpile structures with features thinner than 300 nm, porosities smaller than 700 nm, and at rates up to 50 times faster than conventional point-scanning TPL. Therefore, the exemplary system and method can be employed for the scalable manufacturing of deterministic nanoporous 3D structures for a wide variety of applications.

Additional advantages of embodiments of the present disclosure include: (1) interspersing projection technique & novel resist composition that enables printing porous 3D structures; subsequent projections are not overlapping and can enable printing porous 3D structures; the relationship between subsequent projections that are not overlapping to enable printing porous 3D structures; and new compositions of matter (photoresist) to minimize proximity effects.

Example Controller

It should be appreciated that the logical operations described above, e.g, for the controller or other computing device can be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts, and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

The computer system is capable of executing the software components described herein for the exemplary method or systems. In an embodiment, the computing device may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device to provide the functionality of a number of servers that are not directly bound to the number of computers in the computing device. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or can be hired on an as-needed basis from a third-party provider. Some cloud computing environments may comprise cloud computing resources owned and operated by the enterprise as well as cloud computing resources hired and/or leased from a third-party provider.

In its most basic configuration, a computing device includes at least one processing unit and system memory. Depending on the exact configuration and type of computing device, system memory may be volatile (such as random-access memory (RAM)), non-volatile (such as read-only memory (ROM), flash memory, etc.), or some combination of the two.

The processing unit may be a standard programmable processor that performs arithmetic and logic operations necessary for the operation of the computing device. While only one processing unit is shown, multiple processors may be present. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The computing device may also include a bus or other communication mechanism for communicating information among various components of the computing device.

The processing unit may be configured to execute program code encoded in tangible, computer-readable media. Tangible, computer-readable media refers to any media that is capable of providing data that causes the computing device (i.e., a machine) to operate in a particular fashion. Various computer-readable media may be utilized to provide instructions to the processing unit for execution. Example tangible, computer-readable media may include but is not limited to volatile media, non-volatile media, removable media, and non-removable media implemented in any method or technology for storage of information such as computer-readable instructions, data structures, program modules, or other data. System memory, removable storage, and non-removable storage are all examples of tangible computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In light of the above, it should be appreciated that many types of physical transformations take place in the computer architecture in order to store and execute the software components presented herein. It also should be appreciated that the computer architecture may include other types of computing devices, including hand-held computers, embedded computer systems, personal digital assistants, and other types of computing devices known to those skilled in the art.

In an example implementation, the processing unit may execute program code stored in the system memory. For example, the bus may carry data to the system memory, from which the processing unit receives and executes instructions. The data received by the system memory may optionally be stored on the removable storage or the non-removable storage before or after execution by the processing unit.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

CONCLUSION

Various sizes and dimensions provided herein are merely examples. Other dimensions may be employed.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications, as listed below and throughout this document, describes various application and systems that could be used in combination the exemplary system and are hereby incorporated by reference in their entirety herein.

REFERENCE LIST

Aderneuer, T., O. Fernández, and R. Ferrini. 2021. "Two-photon Grayscale Lithography for Free-Form Micro-Optical Arrays." Optics Express 29 (24): 39511-39520. https://doi.org/10.1364/OE.440251.

Arnoux, C., L. A. Pérez-Covarrubias, A. Khaldi, Q. Carlier, P. L. Baldeck, K. Heggarty, A. Banyasz, and C. Monnereau. 2022. "Understanding and Overcoming Proximity Effects in Multi-Spot two-Photon Direct Laser Writing." Additive Manufacturing 49:102491. https://doi.org/10.1016/j.addma.2021.102491.

Bakar, N. A., A. Abu-Siada, and S. Islam. 2014. "A Review of Dissolved Gas Analysis Measurement and Interpretation Techniques." IEEE Electrical Insulation Magazine 30 (3): 39-49. https://doi.org/10.1109/MEI.2014.6804740.

Bauer, J., C. Crook, and T. Baldacchini. 2023. "A Sinterless, Low temperature Route to 3D Print Nanoscale Optical-Grade Glass." Science 380 (6648): 960-966. https://doi.org/10.1126/science.abq3037.

Bauer, J., C. Crook, A. G. Izard, Z. C. Eckel, N. Ruvalcaba, T. A. Schaedler, and L. Valdevit. 2019. "Additive Manufacturing of Ductile, Ultrastrong Polymer-Derived Nanoceramics." Matter 1 (6): 1547-1556. https://doi.org/10.1016/j.matt.2019.09.009.

Bauer, J., L. R. Meza, T. A. Schaedler, R. Schwaiger, X. Zheng, and L. Valdevit. 2017. "Nanolattices: An Emerging Class of Mechanical Metamaterials." Advanced Materials 29 (40): 1701850. https://doi.org/10.1002/adma.201701850.

Bauer, J., A. Schroer, R. Schwaiger, and O. Kraft. 2016. "Approaching Theoretical Strength in Glassy Carbon Nanolattices." Nature Materials 15 (4): 438-443. https://doi.org/10.1038/nmat4561.

Cao, C., J. Liu, X. Xia, X. Shen, Y. Qiu, C. Kuang, and X. Liu. 2022. "Click Chemistry Assisted Organic-Inorganic Hybrid Photoresist for Ultra-Fast two-Photon Lithography." Additive Manufacturing 51:102658. https://doi.org/10.1016/j.addma.2022.102658.

Carlotti, M., and V. Mattoli. 2019. "Functional Materials for Two-Photon Polymerization in Microfabrication." Small 15 (40): 1902687. https://doi.org/10.1002/smll.201902687.

Choi, H., E. Y. S. Yew, B. Hallacoglu, S. Fantini, C. J. R. Sheppard, and P. T. C. So. 2013. "Improvement of Axial Resolution and Contrast in Temporally Focused Widefield two-Photon Microscopy with Structured Light Illumination." Biomedical Optics Express 4 (7): 995-1005. https://doi.org/10.1364/BOE.4.000995.

Dietrich, P. I., M. Blaicher, I. Reuter, M. Billah, T. Hoose, A. Hofmann, C. Caer, et al. 2018. "In Situ 3D Nanoprinting of Free-Form Coupling Elements for Hybrid Photonic Integration." Nature Photonics 12 (4): 241-247. https://doi.org/10.1038/s41566-018-0133-4.

Fourkas, J. T. 2020. "Fundamentals of Two-Photon Fabrication. Three-Dimensional Microfabrication using Two-Photon Polymerization." Elsevier, 57-76. https://doi.org/10.1016/B978-0-12-817827-0.00051-5.

Gonzalez-Hernandez, D., S. Varapnickas, A. Bertoncini, C. Liberale, and M. Malinauskas. 2023. "Micro-Optics 3D Printed via Multi-Photon Laser Lithography." Advanced Optical Materials 11 (1): 2201701. https://doi.org/10.1002/adom.202201701.

Hahn, V., P. Kiefer, T. Frenzel, J. Qu, E. Blasco, C. Barner-Kowollik, and M. Wegener. 2020. "Rapid Assembly of Small Materials Building Blocks (Voxels) into Large Functional 3D Metamaterials." Advanced Functional Materials, 1907795. https://doi.org/10.1002/adfm.201907795.

Hahn, V., and M. Wegener. 2020. "Response to "Comment on Rapid Assembly of Small Materials Building Blocks (Voxels) into Large Functional 3D Metamaterials"." Advanced Functional Materials, 2003402. https://doi.org/10.1002/adfm.202003402.

Jiang, L. J., Y. S. Zhou, W. Xiong, Y. Gao, X. Huang, L. Jiang, T. Baldacchini, J.-F. Silvain, and Y. F. Lu. 2014. "Two-photon Polymerization: Investigation of Chemical and Mechanical Properties of Resins Using Raman Microspectroscopy." Optics Letters 39 (10): 3034-3037. https://doi.org/10.1364/OL.39.003034.

Jonušauskas, L., S. Juodkazis, and M. Malinauskas. 2018. "Optical 3D Printing: Bridging the Gaps in the Mesoscale." Journal of Optics 20 (5): 053001. https://doi.org/10.1088/2040-8986/aab3fe.

Kim, H., and S. K. Saha. 2020. "Defect Control During Femtosecond Projection Two-photon Lithography." Procedia Manufacturing 48:650-655. https://doi.org/10.1016/j.promfg.2020.05.157.

Kim, H., and S. K. Saha, eds. 2022. Minimizing Shrinkage in Microstructures Printed With Projection Two-Photon Lithography. American Society of Mechanical Engineers, International Manufacturing Science and Engineering Conference. American Society of Mechanical Engineers. https://doi.org/10.1115/MSEC2022-86076.

Ladner, I. S., M. A. Cullinan, and S. K. Saha. 2019. "Tensile Properties of Polymer Nanowires Fabricated via two-Photon Lithography." RSC Advances 9 (49): 28808-28813. https://doi.org/10.1039/C9RA02350J.

LaFratta, C. N., and T. Baldacchini. 2017. "Two-photon Polymerization Metrology: Characterization Methods of Mechanisms and Microstructures." Micromachines 8 (4): 101. https://doi.org/10.3390/mi8040101.

Mettry, M., M. A. Worthington, B. Au, J.-B. Forien, S. Chandrasekaran, N. A. Heth, J. J. Schwartz, et al. 2021. "Refractive Index Matched Polymeric and Preceramic Resins for Height-Scalable two-Photon Lithography." RSC Advances 11 (37): 22633-9. https://doi.org/10.1039/DIRA01733K.

Meza, L. R., S. Das, and J. R. Greer. 2014. "Strong, Lightweight, and Recoverable Three-Dimensional Ceramic Nanolattices." Science 345 (6202): 1322-1326. https://doi.org/10.1126/science.1255908.

Moughames, J., X. Porte, M. Thiel, G. Ulliac, L. Larger, M. Jacquot, M. Kadic, and D. Brunner. 2020. "Three-dimensional Waveguide Interconnects for Scalable Integration of Photonic Neural Networks." Optica 7 (6): 640-646. https://doi.org/10.1364/OPTICA.388205.

Mueller, J. B., J. Fischer, F. Mayer, M. Kadic, and M. Wegener. 2014. "Polymerization Kinetics in Three-Dimensional Direct Laser Writing." Advanced Materials 26 (38): 6566-6571. https://doi.org/10.1002/adma.201402366.

Oakdale, J. S., R. F. Smith, J. B. Forien, W. L. Smith, S. J. Ali, L. B. Bayu Aji, T. M. Willey, et al. 2017. "Direct Laser Writing of low-Density Interdigitated Foams for Plasma Drive Shaping." Advanced Functional Materials 27 (43): 1702425. https://doi.org/10.1002/adfm.201702425.

Oakdale, J. S., J. Ye, W. L. Smith, and J. Biener. 2016. "Post-print UV Curing Method for Improving the Mechanical Properties of Prototypes Derived from two-Photon Lithography." Optics Express 24 (24): 27077-27086. https://doi.org/10.1364/OE.24.027077.

Oron, D., E. Tal, and Y. Silberberg. 2005. "Scanningless Depth-Resolved Microscopy." Optics Express 13 (5): 1468-1476. https://doi.org/10.1364/OPEX.13.001468.

Papagiakoumou, E., E. Ronzitti, and V. Emiliani. 2020. "Scanless Two-photon Excitation with Temporal Focusing." Nature Methods 17 (6): 571-581. https://doi.org/10.1038/s41592-020-0795-y.

Pingali, R., and S. K. Saha. 2022. "Reaction-Diffusion Modeling of Photopolymerization During Femtosecond Projection Two-Photon Lithography." Journal of Manufacturing Science and Engineering 144 (2). https://doi.org/10.1115/1.4051830.

Rumi, M., J. E. Ehrlich, A. A. Heikal, J. W. Perry, S. Barlow, Z. Hu, D. McCord-Maughon, et al. 2000. "Structure-Property Relationships for two-Photon Absorbing Chromophores: Bis-Donor Diphenylpolyene and bis(Styryl) Benzene Derivatives." Journal of the American Chemical Society 122 (39): 9500-9510. https://doi.org/10.1021/ja994497s.

Saha, S. K., and S.-C. Chen. 2020. "Comment on "Rapid Assembly of Small Materials Building Blocks (Voxels) into Large Functional 3D Metamaterials." Advanced Functional Materials, 2001060. https://doi.org/10.1002/adfm.202001060.

Saha, S. K., C. Divin, J. A. Cuadra, and R. M. Panas. 2017. "Effect of Proximity of Features on the Damage Threshold During Submicron Additive Manufacturing via two-Photon Polymerization." Journal of Micro and Nano-Manufacturing 5 (3): 031002. https://doi.org/10.1115/1.4036445.

Saha, S. K., J. S. Oakdale, J. A. Cuadra, C. Divin, J. Ye, J. B. Forien, L. B. Bayu Aji, J. Biener, and W. L. Smith. 2018. "Radiopaque Resists for Two-Photon Lithography To Enable Submicron 3D Imaging of Polymer Parts via X-ray Computed Tomography," ACS Applied Materials & Interfaces 10 (1): 1164-1172. https://doi.org/10.1021/acsami.7b12654.

Saha, S. K., D. Wang, V. H. Nguyen, Y. Chang, J. S. Oakdale, and S.-C. Chen. 2019. "Scalable Submicrometer Additive Manufacturing," Science 366 (6461): 105-109. https://doi.org/10.1126/science.aax8760.

Sakellari, I., E. Kabouraki, D. Gray, V. Purlys, C. Fotakis, A. Pikulin, N. Bityurin, M. Vamvakaki, and M. Farsari. 2012. "Diffusionassisted High-Resolution Direct Femtosecond Laser Writing." ACS Nano 6 (3): 2302-2311. https://doi.org/10.1021/nn204454c.

Selimis, A., V. Mironov, and M. Farsari. 2015. "Direct Laser Writing: Principles and Materials for Scaffold 3D Printing." Microelectronic Engineering 132:83-89. https://doi.org/10.1016/j.mee.2014.10.001.

Skliutas, E., M. Lebedevaite, E. Kabouraki, T. Baldacchini, J. Ostrauskaite, M. Vamvakaki, M. Farsari, S. Juodkazis, and M. Malinauskas. 2021. "Polymerization Mechanisms Initiated by Spatio-Temporally Confined Light." Nanophotonics 10 (4): 1211-1242. https://doi.org/10.1515/nanoph-2020-0551.

Somers, P., Z. Liang, J. E. Johnson, B. W. Boudouris, L. Pan, and X. Xu. 2021. "Rapid, Continuous Projection Multi-Photon 3D Printing Enabled by Spatiotemporal Focusing of Femtosecond Pulses." Light: Science & Applications 10 (1): 199. https://doi.org/10.1038/s41377-021-00645-z.

Sun, M., H. Cheng, P. Golvari, S. M. Kuebler, X. Yu, and M. Zhang. 2022. "Modeling of Two-photon Polymerization in the Strong-Pulse Regime." Additive Manufacturing 60:103241. https://doi.org/10.1016/j.addma.2022.103241.

Sun, H.-B., and S. Kawata. 2004. Two-photon photopolymerization and 3D lithographic microfabrication. NMR• 3D Analysis• Photopolymerization: Springer. p. 169-273. https://doi.org/10.1007/b94405.

Torgersen, J., X. H. Qin, Z. Li, A. Ovsianikov, R. Liska, and J. Stampfl. 2013. "Hydrogels for Two-photon Polymerization: A Toolbox for Mimicking the Extracellular Matrix." Advanced Functional Materials 23 (36): 4542-4554. https://doi.org/10.1002/adfm.201203880.

Vyatskikh, A., S. Delalande, A. Kudo, X. Zhang, C. M. Portela, and J. R. Greer. 2018. "Additive Manufacturing of 3D Nano-Architected Metals." Nature Communications 9 (1): 1-8. https://doi.org/10.1038/s41467-018-03071-9.

Vyatskikh, A., R. C. Ng, B. Edwards, R. M. Briggs, and J. R. Greer. 2020. "Additive Manufacturing of High-Refractive-Index, Nanoarchitected Titanium Dioxide for 3D Dielectric Photonic Crystals." Nano Letters 20 (5): 3513-3520. https://doi.org/10.1021/acs.nanolett.0c00454.

Waller, E. H., and G. Von Freymann. 2016. "Spatio-temporal Proximity Characteristics in 3D u-Printing via Multi-Photon Absorption." Polymers 8 (8): 297. https://doi.org/10.3390/polym8080297.

Wu, S., J. Serbin, and M. Gu. 2006. "Two-photon Polymerisation for Three-Dimensional Micro-Fabrication." Journal of Photochemistry and Photobiology A: Chemistry 181 (1): 1-11. https://doi.org/10.1016/j.jphotochem.2006.03.004.

Xia, X., A. Afshar, H. Yang, C. M. Portela, D. M. Kochmann, C. V. Di Leo, and J. R. Greer. 2019. "Electrochemically Reconfigurable Architected Materials." Nature 573 (7773): 205-213. https://doi.org/10.1038/s41586-019-1538-z.

Yang, L., A. Münchinger, M. Kadic, V. Hahn, F. Mayer, E. Blasco, C. Barner-Kowollik, and M. Wegener. 2019. "On the Schwarzschild Effect in 3D two-Photon Laser Lithography." Advanced Optical Materials 7 (22): 1901040. https://doi.org/10.1002/adom.201901040.

Zheng, L., K. Kurselis, A. El-Tamer, U. Hinze, C. Reinhardt, L. Overmeyer, and B. Chichkov. 2019. "Nanofabrication of High-Resolution Periodic Structures with a gap Size Below 100 nm by Two-photon Polymerization." Nanoscale Research Letters 14 (1): 1-9. https://doi.org/10.1186/s11671-018-2843-4.

Zhu, G., J. Van Howe, M. Durst, W. Zipfel, and C. Xu. 2005. "Simultaneous Spatial and Temporal Focusing of Femtosecond Pulses." Optics Express 13 (6): 2153-2159. https://doi.org/10.1364/OPEX.13.002153.

What is claimed is:

1. A method comprising:
storing or determining a plurality of interspersed features for a three-dimensional (3D) structure to project as a sequence of sparse images on the same plane to generate closely spaced fine features on a polymer resist; and
generating, using the sequence of sparse images, a plurality of patterned light sheet on the polymer resist with a temporally-focused femtosecond pulse, the light sheet having patterns,
wherein the polymer resist comprises a photoinitiator, a radical quencher, and a monomer, wherein the concentration of the photoinitiator is less than one third the concentration of the radical quencher, the radical quencher includes dissolved oxygen, and wherein the solubility threshold DOC of the resist is less than 10%.

2. The method of claim 1, wherein the plurality of interspersed features stored in a sequence of sparse images when projected to the polymer resist generate a 3D structure that mitigate proximity effects for densely packed features.

3. The method of claim 2, wherein the sequence of sparse images have selected pattern period higher than half of the sum of the width of a focal spot and width of a polymerized feature.

4. The method of claim 1, wherein duration, intensity, and/or size of focused light spot of the femtosecond pulse are determined based on an optical dosage per pulse ($D_p$) model.

5. The method of claim 1 further comprising:
generating, using the sequence of sparse images, a plurality of patterned light sheet with a temporally-focused femtosecond pulse on a second layer of polymer resist (e.g., to form the 3D structure), the light sheet having sub-micrometer patterns.

6. The method of claim 1, wherein the method is a part of a P-TPL operation configured to generate a 3D structure with features less than 300 nm, pores finer than 700 nm, and at rates greater than 0.5 mm$^2$/s per layer.

7. The method of claim 1, wherein the method is a part of a P-TPL operation configured to generate a 3D structure at rates greater than 0.5 mm$^2$/s per layer.

8. The method of claim 1, wherein the 3D structure is for at least one of: micro-robotic component, micro-fluidic component, scaffold for bioengineered tissue, mechanical metamaterial, photonic components, or a structured electrode.

9. A system comprising:
a memory having instructions for a plurality of interspersed features for a 3D structure to project as a sequence of sparse images on the same plane to generate closely spaced fine features on a polymer resist; and
lithography equipment configured to generate using the sequence of sparse images a plurality of patterned light sheet on the polymer resist with a temporally-focused femtosecond pulse, wherein the light sheet has patterns,
wherein the polymer resist comprises a photoinitiator, a radical quencher, and a monomer, wherein the concentration of the photoinitiator is less than one third the concentration of the radical quencher, the radical quencher includes dissolved oxygen, and wherein the solubility threshold DOC of the resist is less than 10%.

10. The system of claim 9, wherein the plurality of interspersed features stored in the sequence of sparse images when projected to the polymer resist generate a 3D structure that mitigate proximity effects for densely packed features.

11. The system of claim 9, wherein the sequence of sparse images have selected pattern period higher than half of the sum of the width of a focal spot and width of a polymerized feature.

12. The system of claim 9, wherein duration, intensity, and/or size of focused light spot of the femtosecond pulse are determined based on an optical dosage per pulse model.

13. The system of claim 9, wherein the lithography equipment is configured to generate using the sequence of sparse images, a second plurality of patterned light sheet with a temporally-focused femtosecond pulse on a second layer of polymer resist, the light sheet having sub-micrometer patterns.

14. The system of claim 9, wherein the system is configured to generate a 3D structure with features less than 300 nm, pores finer than 700 nm, and at rates greater than 0.5 mm$^2$/s per layer.

15. The system of claim 9, wherein the system is configured to generate a 3D structure at rates greater than 0.5 mm$^2$/s per layer.

16. The system of claim 9, wherein the lithography equipment is a P-TPL system.

17. A polymer resist comprising:
a photoinitiator, a radical quencher, and a monomer, wherein the concentration of the photoinitiator is less than one-third the concentration of the radical quencher, wherein the radical quencher includes dissolved oxygen, and wherein the solubility threshold DOC of the resist is less than 10%.

* * * * *